United States Patent
Christoffersson et al.

(10) Patent No.: US 12,022,529 B2
(45) Date of Patent: Jun. 25, 2024

(54) RANDOM ACCESS IN A WIRELESS COMMUNICATION SYSTEM

(71) Applicant: Telefonaktiebolaget LM Ericsson (publ), Stockholm (SE)

(72) Inventors: Jan Christoffersson, Luleå (SE); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 334 days.

(21) Appl. No.: 17/416,774

(22) PCT Filed: Dec. 13, 2019

(86) PCT No.: PCT/EP2019/085052
§ 371 (c)(1),
(2) Date: Jun. 21, 2021

(87) PCT Pub. No.: WO2020/126892
PCT Pub. Date: Jun. 25, 2020

(65) Prior Publication Data
US 2022/0078853 A1    Mar. 10, 2022

Related U.S. Application Data

(60) Provisional application No. 62/783,953, filed on Dec. 21, 2018.

(51) Int. Cl.
*H04W 74/0833* (2024.01)
*H04W 72/0446* (2023.01)
(Continued)

(52) U.S. Cl.
CPC ... *H04W 74/0841* (2013.01); *H04W 72/0446* (2013.01); *H04W 72/0453* (2013.01); *H04W 74/0816* (2013.01); *H04W 74/0866* (2013.01)

(58) Field of Classification Search
None
See application file for complete search history.

(56) References Cited

U.S. PATENT DOCUMENTS 10,805,960 B2 * 10/2020 Yi .................. H04L 5/0092
11,736,986 B2 *  8/2023 Kung ............... H04W 76/30
370/331

(Continued)

FOREIGN PATENT DOCUMENTS

WO     2018175809 A1    9/2018

OTHER PUBLICATIONS

3GPP, "3rd Generation Partnership Project; Technical Specification Group Radio Access Network; NR; Medium Access Control (MAC) protocol specification (Release 15) 3GPP TS 38.321 V15.3.0", 3GPP TS 38.321 V15.3.0, Sep. 2018, 1-76.

(Continued)

*Primary Examiner* — Otis L Thompson, Jr.
(74) *Attorney, Agent, or Firm* — Murphy, Bilak & Homiller, PLLC

(57) ABSTRACT

A wireless device (14) transmits a random access preamble (16) and A wireless device (14) transmits a random access preamble (16) and receives, from a network node (12), a random access response (18) that is a response to receipt by the network node (12) of a received random access preamble. In some embodiments, the wireless device (14) also receives, from the network node (12), information about a system frame in which the network node (12) received the received random access preamble. The information may for instance be indicated by an information field (18A). For example, in some embodiments, the random access response (18) includes an information field (18A) indicating such information. Regardless, the wireless device (14) may further be configured to verify, based on the information and a system frame in which the wireless device (14) transmitted (Continued)

the transmitted random access preamble (16), whether the random access response (18) is addressed to the wireless device (14).

25 Claims, 22 Drawing Sheets

(51) Int. Cl.
*H04W 72/0453* (2023.01)
*H04W 74/08* (2009.01)
*H04W 74/0816* (2024.01)

(56) References Cited

U.S. PATENT DOCUMENTS

| | | | | |
|---|---|---|---|---|
| 11,758,585 | B2* | 9/2023 | Da Silva | H04W 36/0055 |
| | | | | 370/329 |
| 2016/0227575 | A1* | 8/2016 | Furuskog | H04W 74/0833 |
| 2016/0323915 | A1 | 11/2016 | Liu et al. | |
| 2017/0223744 | A1* | 8/2017 | Qian | H04W 16/28 |
| 2017/0251460 | A1* | 8/2017 | Agiwal | H04B 7/0617 |
| 2017/0280481 | A1* | 9/2017 | Stern-Berkowitz | |
| | | | | H04L 1/1854 |
| 2017/0332410 | A1 | 11/2017 | Babaei et al. | |
| 2018/0206272 | A1* | 7/2018 | Maaref | H04L 5/0053 |
| 2018/0263063 | A1* | 9/2018 | Islam | H04W 72/0446 |
| 2018/0270869 | A1 | 9/2018 | Tsai | |
| 2019/0090283 | A1* | 3/2019 | Yi | H04L 5/0053 |
| 2020/0068623 | A1* | 2/2020 | Yan | H04W 72/046 |
| 2020/0146054 | A1* | 5/2020 | Jeon | H04L 5/0053 |
| 2021/0014903 | A1* | 1/2021 | Zhang | H04W 76/30 |
| 2021/0321464 | A1* | 10/2021 | Lin | H04W 76/11 |
| 2022/0046711 | A1* | 2/2022 | Kronander | H04W 74/0833 |
| 2023/0156804 | A1* | 5/2023 | Ye | H04W 74/002 |
| | | | | 370/329 |
| 2023/0224022 | A1* | 7/2023 | Shin | H04W 56/0045 |
| | | | | 370/319 |
| 2023/0232461 | A1* | 7/2023 | Qian | H04W 72/046 |
| | | | | 370/329 |
| 2023/0283358 | A1* | 9/2023 | Rudolf | H04B 7/15528 |
| | | | | 370/315 |

OTHER PUBLICATIONS

3GPP, "3rd Generation Partnership Project; Technical Specification Group Radio Access Network; NR; Physical channels and modulation (Release 15)", 3GPP TS 38.211 V15.2.0, Jun. 2018, 1-96.
Samsung, "Random Access Response Reception in NR-U", 3GPP TSG-RAN2 104, R2-1816312, Spokane, USA, Nov. 12-16, 2018, 1-2.

* cited by examiner

RANDOM ACCESS IN A WIRELESS COMMUNICATION SYSTEM

TECHNICAL FIELD

The present application relates generally to a wireless communication system, and relates more particularly to random access in such a system.

BACKGROUND

Random access in a wireless communication system involves wireless devices (e.g., user equipment, UE) transmitting respective random access preambles to a network node (e.g., a base station) over a random access channel. The network node correspondingly receives the random access preambles and transmits random access responses (RARs) as respective responses to those preambles. Once the network node receives a random access preamble, it must transmit a random access response as a response to that preamble within a window of time referred to as the random access response window.

Each random access response may implicitly identify the particular random access preamble to which it is a response, using an identifier that is associated with the random access channel occasion (e.g., time and frequency resource) in which the network node received that random access preamble. The identifier may for instance take the form of a random access radio network temporary identifier (RA-RNTI). Regardless, the identifier may be capable of association with different possible random access channel occasions within the random access response window. Accordingly, if the random access response window is the length of a system frame (e.g., 10 ms), the identifier may be computed as a function of a slot and/or symbol at which a random access channel occasion starts.

Some contexts complicate use of such an identifier for random access. For example, some wireless communication systems (e.g., New Radio Unlicensed, NR-U) require a listen-before-talk (LBT) procedure or clear channel assessment (CCA) before the network node can transmit the random access response. This delay in the random access response may in turn necessitate a longer random access response window. However, expansion of the random access response window complicates computation of the identifier. Expanding the window to be longer than a system frame, for instance, may require the identifier to also be computed as a function of the system frame in which the random access channel occasion starts. But this threatens to undesirably increase the value space of the identifier, and correspondingly impose greater computational burden and consume more radio resources for random access.

SUMMARY

Some embodiments herein advantageously accommodate a random access response window longer than the length of a system frame, without increasing the value space of the identifier (e.g., RA-RNTI) associated with a random access channel occasion. According to one or more embodiments, for instance, the identifier may be determined based on an input parameter (e.g., s_id or t_id) that is a function of not only the first symbol (or first slot) of the random access channel occasion starts but also the system frame in which the occasion starts. Some of these embodiments may exploit values of that input parameter which would have otherwise gone unused with respect to the symbol or slot of the occasion, in order to effectively overload the input parameter so that it is also a function of the system frame of the occasion. Other embodiments herein effectively re-configure an input parameter (e.g., s_id, t_id, or ul_carrier) based on which the identifier is determined, when all or some of the values of that input parameter would have otherwise gone unused, so that the input parameter may be defined (at least in part) on the system frame in which the occasion starts. Still other embodiments herein exploit an information field (e.g., the R bit field) in the random access response itself in order to indicate information about the system frame in which the random access response was received. No matter the particular approach, these and other embodiments herein may advantageously avoid increasing the value space of the identifier, so as to correspondingly avoid imposing a greater computational burden and consuming more radio resources for random access.

Embodiments herein for example include a method performed by a wireless device. The method includes transmitting a random access preamble. The method also includes receiving, from a network node, a random access response that is a response to receipt by the network node of a received random access preamble. In some embodiments, the method further includes receiving, from the network node, information about a system frame in which the network node received the received random access preamble. The information may for instance be indicated by an information field. For example, in some embodiments, the random access response includes an information field indicating such information. Regardless, the method may further include verifying, based on the information and a system frame in which the wireless device transmitted the transmitted random access preamble, whether the random access response is addressed to the wireless device.

In embodiments where an information field indicates the information about a system frame in which the network node received the received random access preamble, the information field may be a reserved, R, bit field. Alternatively or additionally, the information field in some embodiments indicates a value of y=SFNy mod N, where SFNy is an index of the system frame in which the network node received the received random access preamble, and where N is a maximum duration of a random access response window in terms of a number of system frames. In one embodiment, for instance, N is 2 such that y=0 when the index of the system frame in which the network node received the received random access preamble is even and y=1 when the index of the system frame in which the network node received the received random access preamble is odd. In some embodiments, then, said verifying comprises: determining a value of x=SFNx mod N, where SFNx is an index of the system frame in which the wireless device transmitted the transmitted random access preamble; and determining whether the random access response is addressed to the wireless device based on whether x=y.

In some embodiments where an information field indicates the information about a system frame in which the network node received the received random access preamble, the information field indicates a number Dy of system frames between the system frame in which the network node received the received random access preamble and the system frame in which the network node transmitted the random access response. In one such embodiment, said verifying comprises: determining a number Dx of system frames between the system frame in which the wireless device transmitted the transmitted random access preamble and the system frame in which the wireless device received the random access response; and determining whether the random access response is addressed to the wireless device based on whether Dx equals Dy as indicated by the information field.

In some embodiments, a random access response window has a duration greater than a duration of a system frame.

In some embodiments where an information field indicates the information about a system frame in which the network node received the received random access preamble, said verifying comprises: determining, from the information field, the system frame in which the network node received the received random access preamble; and verifying whether or not the random access response is addressed to the wireless device based, at least in part, on whether or not the system frame in which the network node received the received random access preamble according to said determining is the same as the system frame in which the wireless device transmitted the transmitted random access preamble.

In some embodiments, said verifying is further based on whether a cyclic redundancy check, CRC, of the random access response is scrambled with a random access radio network temporary identifier, RA-RNTI, associated with a random access channel occasion in which the wireless device transmitted the transmitted random access preamble.

In some embodiments, the method further comprises processing or discarding the random access response, depending respectively on whether the random access response is or is not addressed to the wireless device according to said verifying.

In some embodiments, the method further comprises, based on the random access response being addressed to the wireless device according to said verifying, transmitting a connection request to a radio network node from which the random access response was received.

In some embodiments, the random access preamble is transmitted, and/or the random access response is received, in unlicensed frequency spectrum.

Embodiments herein also include a method performed by a network node. The method comprises receiving a random access preamble. The method further comprises transmitting a random access response that is a response to receipt by the network node of the received random access preamble. The method also comprises transmitting information about a system frame in which the network node received the received random access preamble. The information may for instance be indicated by an information field. For example, in some embodiments, the random access response includes an information field indicating such information.

In embodiments where an information field indicates the information about a system frame in which the network node received the received random access preamble, the information field may be a reserved, R, bit field. Alternatively or additionally, the information field in some embodiments indicates a value of y=SFNy mod N, where SFNy is an index of the system frame in which the network node received the received random access preamble, and where N is a maximum duration of a random access response window in terms of a number of system frames. In one embodiment, for instance, N is 2 such that y=0 when the index of the system frame in which the network node received the received random access preamble is even and y=1 when the index of the system frame in which the network node received the received random access preamble is odd.

In some embodiments where an information field indicates the information about a system frame in which the network node received the received random access preamble, the information field indicates a number Dy of system frames between the system frame in which the network node received the received random access preamble and the system frame in which the network node transmitted the random access response.

In some embodiments, the random access preamble is transmitted, and/or the random access response is received, in unlicensed frequency spectrum. In this case, the method may further comprise performing a listen-before-talk, LBT, procedure or a clear channel assessment, CCA, before transmitting the random access response.

Embodiments herein also include a wireless device. The wireless device is configured to transmit a random access preamble. The wireless device is configured to also receive, from a network node, a random access response that is a response to receipt by the network node of a received random access preamble. In some embodiments, the wireless device is configured to further receive, from the network node, information about a system frame in which the network node received the received random access preamble. The information may for instance be indicated by an information field. For example, in some embodiments, the random access response includes an information field indicating such information. Regardless, the wireless device may be configured to verify, based on the information and a system frame in which the wireless device transmitted the transmitted random access preamble, whether the random access response is addressed to the wireless device.

Embodiments herein moreover include a network node. The network node is configured to receive a random access preamble. The network node is further configured to transmit a random access response that is a response to receipt by the network node of the received random access preamble. The network node is also configured to transmit information about a system frame in which the network node received the received random access preamble. The information may for instance be indicated by an information field. For example, in some embodiments, the random access response includes an information field indicating such information.

Embodiments herein furthermore include corresponding computer programs and carriers, e.g., non-transitory computer-readable mediums on which the computer programs are respectively stored.

DETAILED DESCRIPTION

Figure 1:
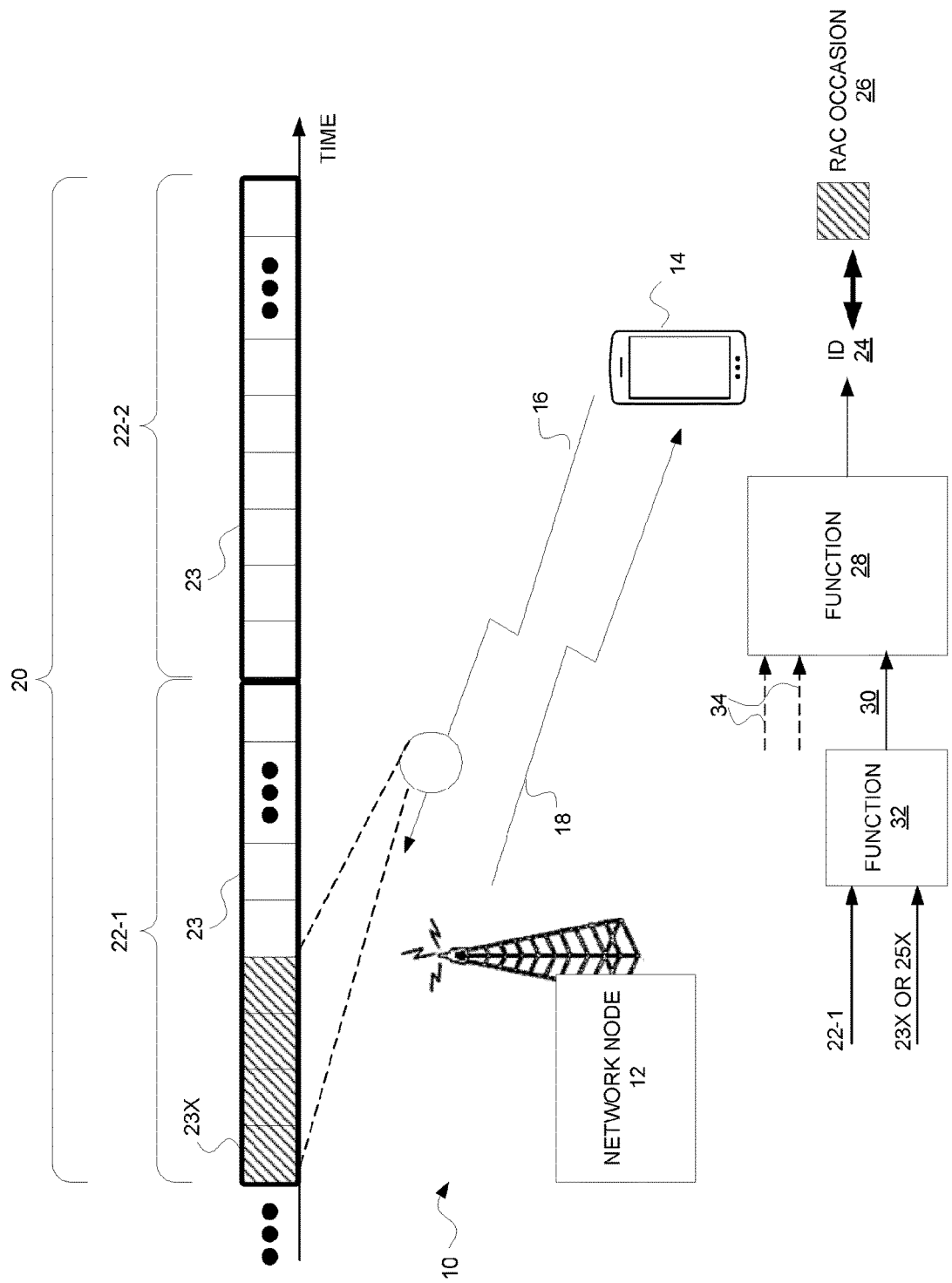
FIG. 1 is a block diagram of a wireless communication system according to some embodiments.
Figure 13:
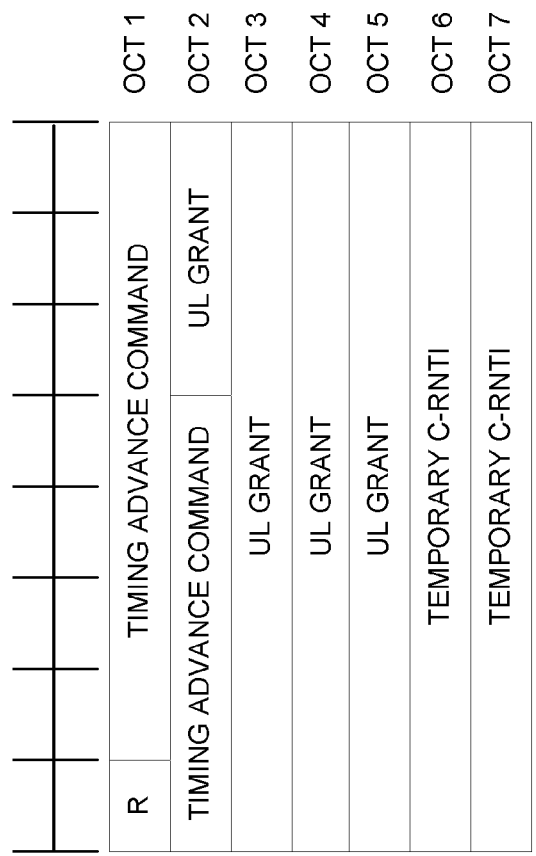
FIG. 13 is a block diagram of a random access response message in a New Radio (NR) system according to some embodiments.

FIG. 1 shows a wireless communication system 10 according to some embodiments. The system 10 may for instance be a New Radio Unlicensed (NR-U) system and/or operate on unlicensed frequency spectrum. The system 10 includes a network node 12 (e.g., a radio network node such as a base station) and a wireless device 14 (e.g., a user equipment, UE). The wireless device 14 is configured to transmit a random access preamble 16 to the network node 12, e.g., on a random access channel. The device 15 may do so for random access to the system 10, which may for instance be needed for establishing a connection with the system 10, for acquiring uplink synchronization, and/or for other reasons. The network node 12 is configured to correspondingly receive the random access preamble 16 and transmit a random access response 18 as a response to that preamble 16. A random access response 18 as used herein encompasses any transmission that the network node 12 transmits in response to receiving the preamble 16. The random access response 18 may for example include at least a Random Access Response (RAR), e.g., as shown in FIG. 13. In some embodiments, such as where the response 18 is transmitted on unlicensed frequency spectrum, the network node 12 may be required to perform a listen-before-talk (LBT) procedure or clear channel assessment (CCA) before transmitting the response 18.

The network node 12 may be configured to transmit the response 18 within a certain amount of time since having received the random access preamble 16. This amount of time is referred to as a random access response window 20. The random access response window 20 in some embodiments has a duration that spans multiple system frames (also referred to as radio frames). As shown, for instance, the random access response window has a duration that spans two system frames 22-1 and 22-2, starting from the time at which the random access preamble 16 is received. Each system frame 22-1 and 22-2 is in turn shown as including multiple time slots (or simply slots) 23. Although not shown, each time slot may include multiple symbols (e.g., orthogonal frequency division multiplexing, OFDM, symbols).

The random access response 18 may implicitly identify the random access preamble 16 as the preamble to which it is a response, using an identifier (ID) 24. The network node 12 may for instance effectively determine (e.g., compute) and use the identifier 24 to address the random access response 18 to the wireless device 14. And the wireless device 14 may correspondingly determine (e.g., compute) the identifier 24 and use it to verify whether or not the random access response 18 is addressed to the wireless device 14. In some embodiments, for example where the identifier 24 is a random access radio network temporary identifier (RA-RNTI), the network node 12 determines the identifier 24 based on its reception of the random access preamble 16 and scrambles a cyclic redundancy check (CRC) of the random access response 18 using the identifier 24. The wireless device 14 likewise determines the identifier 24 based on its transmission of the random access preamble 16 and verifies whether a CRC of the random access response 18 is scrambled with the identifier 24.

In any event, the identifier 24 is associated with a random access channel occasion 26 in which the wireless device 14 transmitted and the network node 12 received the random access preamble 16. The random access channel occasion 26 may for instance be or correspond to the time and/or frequency resources on which the random access preamble 16 was transmitted and received. FIG. 1 for example shows the random access channel occasion 26 in the time domain as starting in the first slot 23X of the first system frame 22-1 within the random access response window 20. The identifier 24 may be capable of association with different possible random access channel occasions within the random access response window 20. Because the random access response window 20 spans multiple system frames 22-1, 22-2, the identifier 24 may be determined (e.g., computed) as a function of the system frame 22-1 in which the random access channel occasion 26 starts. This way, the identifier 24 distinguishes between random access channel occasions starting in the same slot and symbol, but within different system frames.

To avoid increasing the value space of the identifier 24, though, the identifier 24 may be determined in a particular way by the network node 12 and the wireless device 14. In this regard, FIG. 1 shows that the identifier 24 is a function 28 of the value of an input parameter 30 (e.g., s_id or t_id), e.g., in addition to being a function 28 of the value(s) of one or more other input parameters 34. The input parameter 30 is in turn a function 32 of the first slot 23X (or the first symbol 25X) of the random access channel occasion 26. Notably, the input parameter 30 is also a function 32 of the system frame 22-1 in which the random access channel occasion 26 starts.

For example, in some embodiments where the identifier 24 is an RA-RNTI, the identifier 24 may be computed as:

RA-RNTI=1+s_id+14×t_id+14×80×f_id+14×80×
8×ul_carrier_id where the input parameter 30 is t_id, and where s_id is the index of the first OFDM symbol of the random access channel occasion 26, f_id is the index of the random access channel occasion 26 in the frequency domain, and ul_carrier_id is the uplink carrier used for transmission of the random access preamble 16. In this case, then, t_id as the input parameter 30 is a function of both: (i) the index of the first slot of the random access channel occasion 26; and (ii) the system frame 22-1 in which the random access channel occasion 26 starts.

As another example of embodiments where the identifier 24 is an RA-RNTI, the identifier 24 may be computed as:

$$\text{RA-RNTI}=1+s\_id+14\times t\_id+14\times 80\times f\_id+14\times 80\times 8\times ul\_carrier\_id$$

where s_id is the input parameter 30, and where t_id is the index of the first slot of the random access channel occasion 26, f_id is the index of the random access channel occasion 26 in the frequency domain, and ul_carrier_id is the uplink carrier used for transmission of the random access preamble 16. In this case, then, s_id as the input parameter 30 is a function of both: (i) the index of the first OFDM symbol of the random access channel occasion 26; and (ii) the system frame 22-1 in which the random access channel occasion 26 starts.

Note here that some embodiments exploit values of the input parameter 30 that would have otherwise gone unused with respect to the first symbol or first slot of the occasion 26, in order to effectively overload the input parameter 30 so that it is also a function of the system frame 22-1 in which the occasion starts 26. See, e.g., descriptions of Embodiments 1-4 with respect to unused values of s_id and t_id under some circumstances.

Some embodiments exploit the otherwise unused values of the input parameter 30 by partitioning the possible values for the input parameter 30 into different subsets corresponding to different possible system frames in which a random access channel occasion may start. For example, a subset of possible values 0-39 for the input parameter 30 may correspond to system frame 22-1 whereas another subset of possible values 40-79 may correspond to system frame 22-2. The values in each subset may each index or otherwise indicate the different possible symbols (or slots) of a random access channel occasion. Accordingly, determining the value of the input parameter 30 may involve selecting, from among multiple different subsets of possible values for the input parameter 30, a subset of possible values for the input parameter 30 based on the system frame 22-1 in which the random access channel occasion 26 starts, e.g., the subset of values 0-39 for system frame 22-1 in FIG. 1. It may further entail determining, from the possible values within the selected subset, the value for the input parameter 30 based on the first symbol of, or the first slot of, the random access channel occasion 26.

In some embodiments, the different subsets are respectively associated with different possible values of SFN mod N, where SFN is an index of the system frame 22-1 in which the random access channel occasion 26 starts, and where N is a maximum duration of a random access response window 20 in terms of a number of system frames. In this case, selecting the subset may comprise computing y=SFN mod N and selecting the subset of possible values for the input parameter based on y. Embodiment 1 (FIG. 11) for t_id and Embodiment 3 for s_id discussed below in the context of NR-U illustrate an example of these embodiments where N is 2. Here, y=0 when the index of the system frame in which the random access channel occasion starts is even and y=1 when the index of the system frame in which the random access channel occasions starts is odd.

Figure 12:
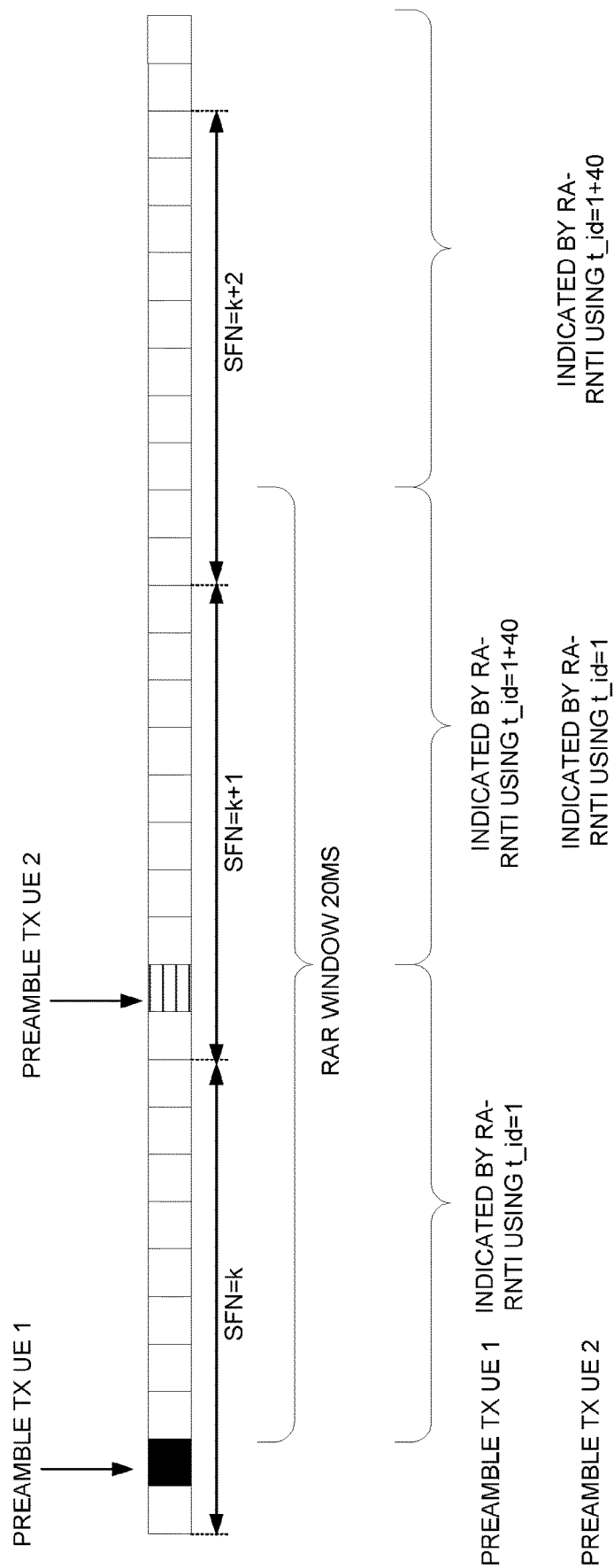
FIG. 12 is a block diagram illustrating random access radio network temporary identifier (RA-RNTI) generation according to other embodiments.

In other embodiment, the selection of the subset is further based on a system frame in which the random access response is transmitted or received. In this case, for example, such selection may entail determining a number D of system frames between the system frame in which the random access channel occasion starts and the system frame in which the random access response is received. Selection may then involve selecting the subset of possible values based on the determined number D, wherein different subsets are respectively associated with different possible values for D given a duration of a random access response window. Embodiment 2 (FIG. 12) for t_id and Embodiment 4 for s_id discussed below in the context of NR-U illustrate an example of these embodiments.

Some embodiments herein are conditionally or selectively applied by the network node 12 and/or the wireless device 14, e.g., some embodiments may be configured on a dynamic, semi-static, or static basis. In one or more embodiments, for instance, whether all or at least some values of the input parameter 30 would otherwise go unused depends on configuration of the system 10 and/or the network node 12, e.g., in terms of subcarrier spacing, random access channel configuration, or the like. In some embodiments, the network node 12 transmits (e.g., broadcasts) configuration information (e.g., system information) indicating this configuration. The network node 12 and/or the wireless device 14 may conditionally or selectively apply certain embodiments herein (either individually or in alternative fashion) depending on the configuration information. For example, if the configuration information is such that all or at least some values of the input parameter 30 would otherwise go unused, the network node 12 and the wireless device 14 may selectively apply one or more of the embodiments above. Alternatively or additionally, different configuration information may serve as different preconditions for different ones of the embodiments above such that the network node 12 and the wireless device 14 apply whichever one of the embodiments above is allowable, enabled, and/or preferable given the configuration information. In fact, in some embodiments, the embodiments above may be preferentially applied in a priority order, e.g., Embodiment 1 applied if possible, then Embodiment 3 if Embodiment 1 cannot be applied, and so forth.

Figure 2:
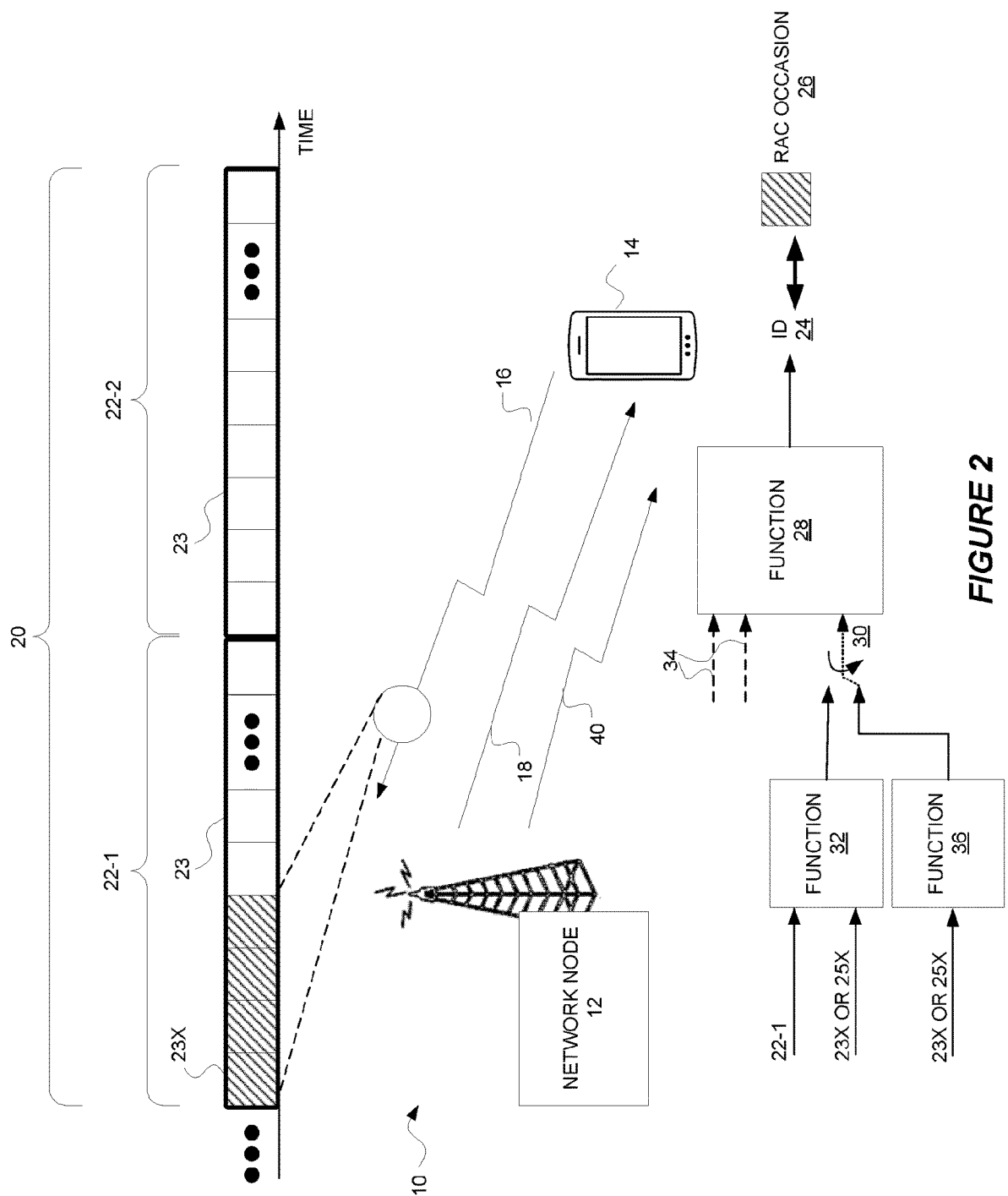
FIG. 2 is a block diagram of a wireless communication system according to other embodiments.

Without regard to use of different embodiments in the alternative, though, FIG. 2 generally illustrates some embodiments herein that depend on configuration information. As shown, the network node 12 transmits configuration information 40 (e.g., system information). The configuration information 40 may for instance indicate a sub-carrier spacing (e.g., msg1-SubcarrierSpacing Information element in RACH config-common). Alternatively or additionally, the configuration information 40 may indicate a random access configuration (e.g., msg1-FDM in RACH-ConfigGeneric). Alternatively or additionally, the configuration information 40 may indicate a number of uplink carriers (e.g., SUL in initialUplinkBWP).

The network node 12 and the wireless device 14 may be configured to select, based on this configuration information 40, a function from different possible functions for determining the value of the input parameter 30. As shown, for instance, different functions 32 and 36 are defined for determining the value of the input parameter 30. One function 36 includes determining the value based only on the first slot 23X or the first symbol 25X of the random access channel occasion 26. Another function 32 however may define the value of the input parameter 30 based on a system frame 22-1 in which the random access channel occasion 26 starts. For example, as described in FIG. 1, and as shown in FIG. 2, the function 32 may be a function of both the first slot (or first symbol) of the random access channel occasion 26 as well as the system frame 22-1 in which the random access channel occasion 26 starts.

In other embodiments (not shown), the function 36 may be a function of an uplink carrier on which the random access preamble 16 is transmitted, whereas the function 32 is a function of the system frame 22-1 in which the random access channel occasion 26 starts. This may be the case for instance where the input parameter 30 is ul_carrier as described in Embodiment 5 below. Such an embodiment may exploit all values of the input parameter 30 going otherwise unused, e.g., if there is only 1 uplink carrier possible such that no signalling of it is needed.

In general, though, different functions may be defined for different values of the input parameter 30 depending on configuration information transmitted by the network node 12. The network node 12 and the wireless device 14 may be configured to select between the functions based on the configuration information 40 (e.g., the subcarrier spacing, the random access channel configuration, the number of uplink carriers, etc.), and then determine the value of the input parameter 30 based on the selected function.

Figure 3:
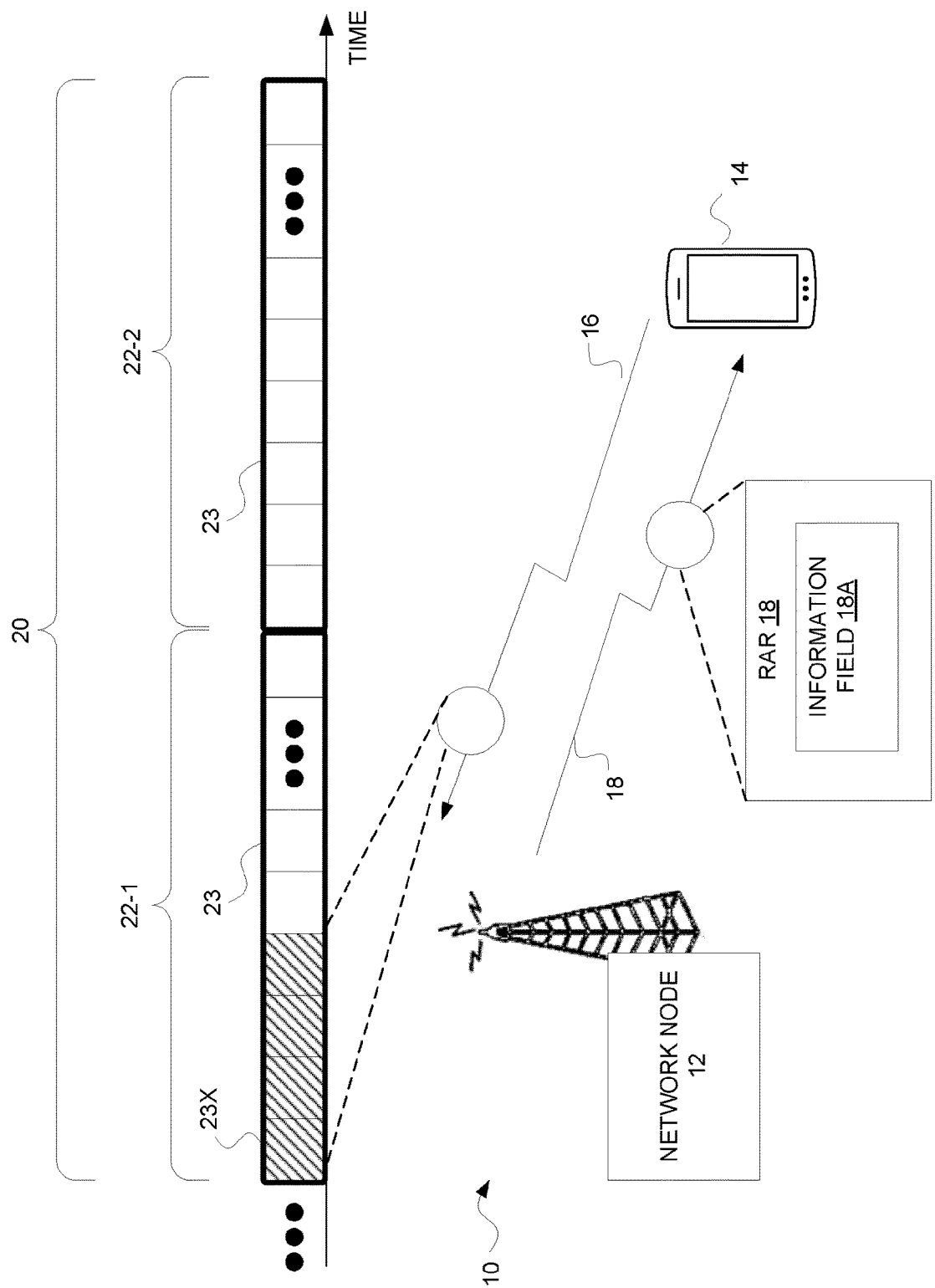
FIG. 3 is a block diagram of a wireless communication system according to still other embodiments.

FIG. 3 illustrates still other embodiments where the random access response 18 itself includes an information field 18A indicating information about a system frame 22-1 in which the network node 12 received the received random access preamble 16. In this case, the identifier discussed above may not be a function of the system frame 22-1.

Figure 4:
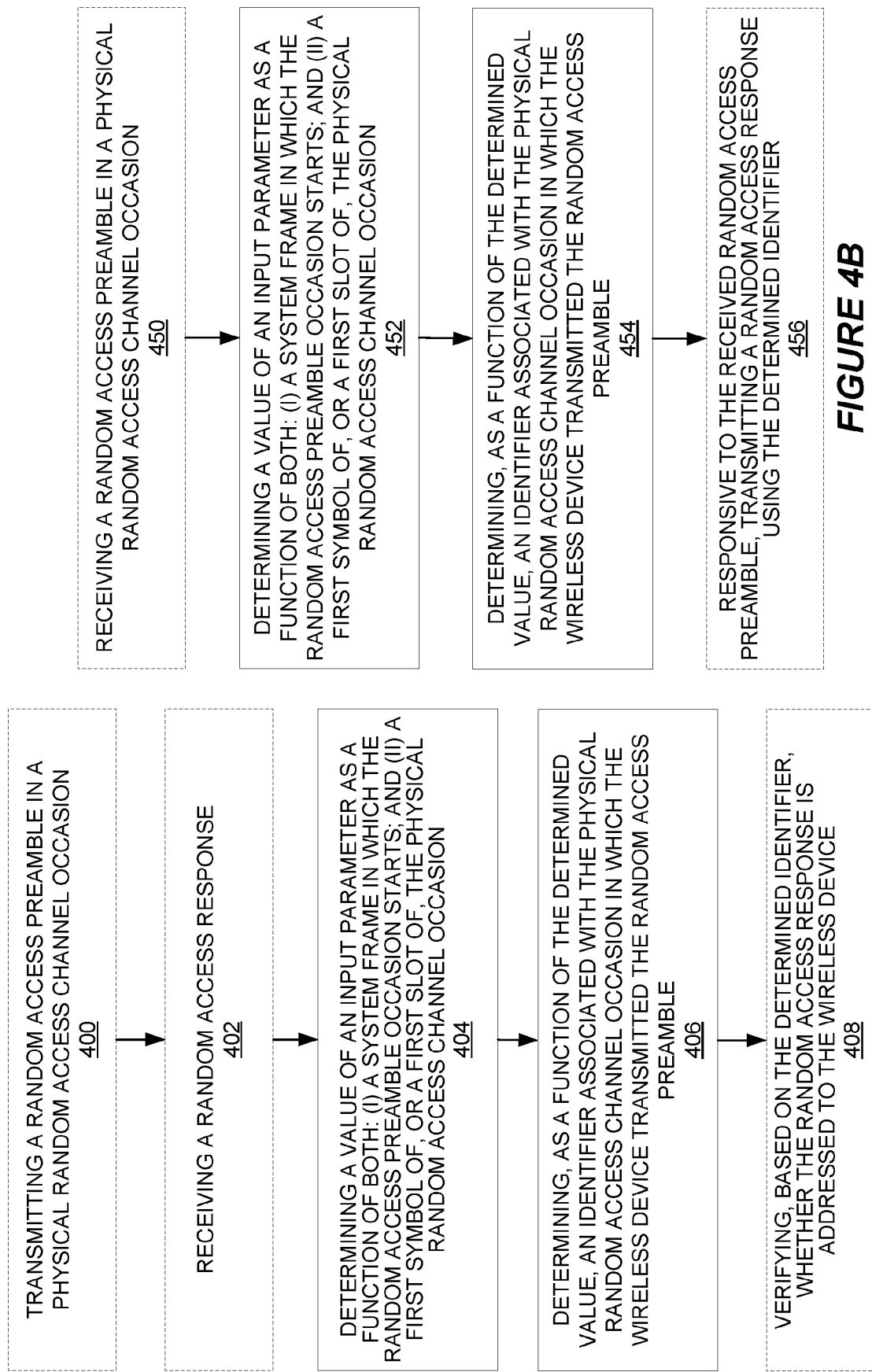
FIG. 4A is a logic flow diagram of a method performed by a wireless device according to some embodiments.
FIG. 4B is a logic flow diagram of a method performed by a network node according to some embodiments.

In view of the above modifications and variations, FIG. 4A depicts a method performed by a wireless device 14 in accordance with particular embodiments, e.g., as described in FIG. 1. The method as shown may include transmitting a random access preamble 16 in a random access channel occasion 26 (e.g., a PRACH occasion) (Block 500). The method may also include receiving a random access response 18 (Block 502). In some embodiments (e.g., applicable to NR-U), the random access preamble 16 is transmitted, and/or the random access response 18 is received, in unlicensed frequency spectrum.

The method may further include determining a value of an input parameter 30 (e.g., t_id or s_id) (Block 504). For example, the value of the input parameter 30 may be determined as a function of both: (i) a system frame in which the random access channel occasion 26 starts; and (ii) a first symbol of, or a first slot of, the random access channel occasion 26.

In some embodiments, for example, determining the value of the input parameter 30 may involve selecting, from among multiple different subsets of possible values for the input parameter 30, a subset of possible values for the input parameter 30 based on the system frame in which the random access channel occasion 26 starts. The determination in this case may further entail determining, from the possible values within the selected subset, the value for the input parameter 30 based on the first symbol of, or the first slot of, the random access channel occasion 26.

In one such embodiment, the different subsets are respectively associated with different possible values of SFN mod N. Here, SFN is an index of the system frame in which the random access channel occasion 26 starts, and N is a maximum duration of a random access response window in terms of a number of system frames. In this case, said selecting may comprise computing y=SFN mod N and selecting the subset of possible values for the input parameter based on y. In one embodiment, N is 2 such that y=0 when the index of the system frame in which the random access channel occasion starts is even and y=1 when the index of the system frame in which the random access channel occasions starts is odd.

In another embodiment, said selecting is further based on a system frame in which the random access response is received. In one such embodiment, said selecting may comprise determining a number D of system frames between the system frame in which the random access channel occasion starts and the system frame in which the random access response is received; and selecting the subset of possible values based on the determined number D, wherein different subsets are respectively associated with different possible values for D given a duration of a random access response window. For example, in some embodiments, determining the number D comprises determining a duration between when the random access channel occasion starts and when the random access response was received, and dividing the determined duration by a duration of a system frame.

In any event, the value of the input parameter may in some embodiments be determined as a function of whether the random access preamble was transmitted in the same system frame as a system frame in which the random access response was received.

Regardless, the method may also include determining (e.g., computing), as a function of the determined value, an identifier 24 (e.g., an RA-RNTI) associated with the random access channel occasion 26 in which the wireless device 14 transmitted the random access preamble 16 (Block 506). In some embodiments, the method further includes verifying, based on the determined identifier 24, whether the random access response 18 is addressed to the wireless device 14 (Block 508). Such verifying may for instance comprise verifying whether a cyclic redundancy check, CRC, of the random access response 18 is scrambled with the determined identifier 24.

Although not shown, the method in some embodiments may further include processing or discarding the random access response 18, depending respectively on whether the random access response 18 is or is not addressed to the wireless device 14 according to said verifying. Alternatively or additionally, the method may further include, based on the random access response 18 being addressed to the wireless device 14 according to said verifying, transmitting a connection request to a radio network node from which the random access response 18 was received.

Alternatively or additionally, the method may also include receiving configuration information, e.g., comprising system information. In this case, determining the value of the input parameter as a function of the system frame in which the random access channel occasion starts may be performed based on the received configuration information. In one embodiment, for instance, the wireless device is configured to determine the value of the input parameter according to different possible functions, depending on configuration information received.

In some embodiments, a range of possible values for the input parameter may support indexing a maximum number of slots in a system frame, where the configuration information indicates a value for a configurable parameter, and where the number of slots in a system frame depends on the value for the configurable parameter. Alternatively or additionally, the configuration information may indicate a subcarrier spacing. In this case, determining the value of the parameter as a function of the system frame in which the random access channel occasion starts may be performed based on the subcarrier spacing being below a maximum supported subcarrier spacing.

In other embodiments, a range of possible values for the input parameter supports indexing a maximum number of symbols in a slot. In this case, the configuration information may indicate a value for a configurable parameter. And in which symbol the random access channel occasion is allowed to start depends on the value for the configurable parameter.

In some embodiments, the configuration information indicates a random access channel configuration index. In this case, determining the value of the parameter as a function of the system frame in which the random access channel occasion starts is performed based on the random access channel configuration index indicating a random access channel configuration that limits in which symbol the random access channel occasion is allowed to start.

In some embodiments, a random access response window has a duration greater than a duration of a system frame.

Alternatively or additionally, the value of the input parameter may be determined in some embodiments as a function of an index of the first slot of the random access channel occasion in a system frame. In one such embodiment, the identifier is a random access radio network temporary identifier, RA-RNTI, and the RA-RNTI is determined as:

$$RA\text{-}RNTI = 1 + s\_id + 14 \times t\_id + 14 \times 80 \times f\_id + 14 \times 80 \times 8 \times ul\_carrier\_id$$

where the input parameter is t_id, and where s_id is the index of the first OFDM symbol of the random access channel occasion, f_id is the index of the random access channel occasion in the frequency domain, and ul_carrier_id is the uplink carrier used for transmission of the random access preamble.

In other embodiments, the value of the input parameter may be determined as a function of an index of the first symbol of the random access channel occasion.

In one such embodiment, the identifier is a random access radio network temporary identifier, RA-RNTI, and the RA-RNTI is determined as:

$$RA\text{-}RNTI = 1 + s\_id + 14 \times t\_id + 14 \times 80 \times f\_id + 14 \times 80 \times 8 \times ul\_carrier\_id$$

where the input parameter is s_id, and where t_id is the index of the first slot of the random access channel occasion in a system frame, f_id is the index of the random access channel occasion in the frequency domain, and ul_carrier_id is the uplink carrier used for transmission of the random access preamble.

FIG. 4B depicts a method performed by a network node 12 in accordance with particular embodiments, e.g., as described in FIG. 1. The method as shown may include receiving a random access preamble 16 in a random access channel occasion 26 (e.g., a PRACH occasion) (Block 550). In some embodiments (e.g., applicable to NR-U), the random access preamble 16 is received in unlicensed frequency spectrum.

The method may further include determining a value of an input parameter 30 (e.g., t_id or s_id) (Block 552). For example, the value of the input parameter 30 may be determined as a function of both: (i) a system frame in which the random access channel occasion 26 starts; and (ii) a first symbol of, or a first slot of, the random access channel occasion 26. In some embodiments, for example, determining the value of the input parameter 30 may involve selecting, from among multiple different subsets of possible values for the input parameter 30, a subset of possible values for the input parameter 30 based on the system frame in which the random access channel occasion 26 starts. The determination in this case may further entail determining, from the possible values within the selected subset, the value for the input parameter 30 based on the first symbol of, or the first slot of, the random access channel occasion 26.

In one such embodiment, the different subsets are respectively associated with different possible values of SFN mod N. Here, SFN is an index of the system frame in which the random access channel occasion starts, and N is a maximum duration of a random access response window in terms of a number of system frames. In this case, said selecting may comprise computing y=SFN mod N and selecting the subset of possible values for the input parameter based on y. In one embodiment, N is 2 such that y=0 when the index of the system frame in which the random access channel occasion starts is even and y=1 when the index of the system frame in which the random access channel occasions starts is odd.

In another embodiment, said selecting is further based on a system frame in which the random access response is to be transmitted. In one such embodiment, said selecting may comprise determining a number D of system frames between the system frame in which the random access channel occasion starts and the system frame in which the random access response is to be transmitted; and selecting the subset of possible values based on the determined number D, wherein different subsets are respectively associated with different possible values for D given a duration of a random access response window. For example, in some embodiments, determining the number D comprises determining a duration between when the random access channel occasion starts and when the random access response is transmitted, and dividing the determined duration by a duration of a system frame.

In any event, the value of the input parameter may in some embodiments be determined as a function of whether the random access preamble was received in the same system frame as a system frame in which the random access response is transmitted.

Regardless, the method may also include determining (e.g., computing), as a function of the determined value, an identifier 24 (e.g., an RA-RNTI) associated with the random access channel occasion 26 in which the wireless device 14 transmitted the random access preamble 16 (Block 554). In some embodiments, the method further includes responsive to the received random access preamble 16, transmitting a random access response 18 using the determined identifier 24 (Block 556). Such transmission may for instance comprise scrambling a cyclic redundancy check, CRC, of the random access response 18 using the determined identifier 24 and transmitting the random access response 18 with the CRC of the random access response 18 scrambled.

Alternatively or additionally, the method may also include transmitting configuration information, e.g., comprising system information. In this case, determining the value of the input parameter as a function of the system frame in which the random access channel occasion starts may be performed based on the transmitted configuration information. In one embodiment, for instance, the network node is configured to determine the value of the input parameter according to different possible functions, depending on configuration information transmitted.

In some embodiments, a range of possible values for the input parameter may support indexing a maximum number of slots in a system frame, where the configuration information indicates a value for a configurable parameter, and where the number of slots in a system frame depends on the value for the configurable parameter. Alternatively or additionally, the configuration information may indicate a subcarrier spacing. In this case, determining the value of the parameter as a function of the system frame in which the random access channel occasion starts may be performed based on the subcarrier spacing being below a maximum supported subcarrier spacing.

In other embodiments, a range of possible values for the input parameter supports indexing a maximum number of symbols in a slot. In this case, the configuration information may indicate a value for a configurable parameter. And in which symbol the random access channel occasion is allowed to start depends on the value for the configurable parameter.

In some embodiments, the configuration information indicates a random access channel configuration index. In this case, determining the value of the parameter as a function of the system frame in which the random access channel occasion starts is performed based on the random access channel configuration index indicating a random access channel configuration that limits in which symbol the random access channel occasion is allowed to start.

In some embodiments, a random access response window has a duration greater than a duration of a system frame.

Alternatively or additionally, the value of the input parameter may be determined in some embodiments as a function of an index of the first slot of the random access channel occasion in a system frame. In one such embodiment, the identifier is a random access radio network temporary identifier, RA-RNTI, and the RA-RNTI is determined as:

$$\text{RA-RNTI}=1+s\_id+14\times t\_id+14\times 80\times f\_id+14\times 80\times 8\times ul\_carrier\_id$$

where the input parameter is t_id, and where s_id is the index of the first OFDM symbol of the random access channel occasion, f_id is the index of the random access channel occasion in the frequency domain, and ul_carrier_id is the uplink carrier used for transmission of the random access preamble.

In other embodiments, the value of the input parameter may be determined as a function of an index of the first symbol of the random access channel occasion. In one such embodiment, the identifier is a random access radio network temporary identifier, RA-RNTI, and the RA-RNTI is determined as:

$$\text{RA-RNTI}=1+s\_id+14\times t\_id+14\times 80\times f\_id+14\times 80\times 8\times ul\_carrier\_id$$

where the input parameter is s_id, and where t_id is the index of the first slot of the random access channel occasion in a system frame, f_id is the index of the random access channel occasion in the frequency domain, and ul_carrier_id is the uplink carrier used for transmission of the random access preamble.

In some embodiments (e.g., applicable to NR-U), the random access response 18 is transmitted in unlicensed frequency spectrum. In these and other embodiments, the method may also include performing a listen-before-talk, LBT, procedure or a clear channel assessment, CCA, before transmitting the random access response 18.

In some embodiments, the method further comprises performing a listen-before-talk, LBT, procedure or a clear channel assessment, CCA, before transmitting the random access response.

Figure 5:
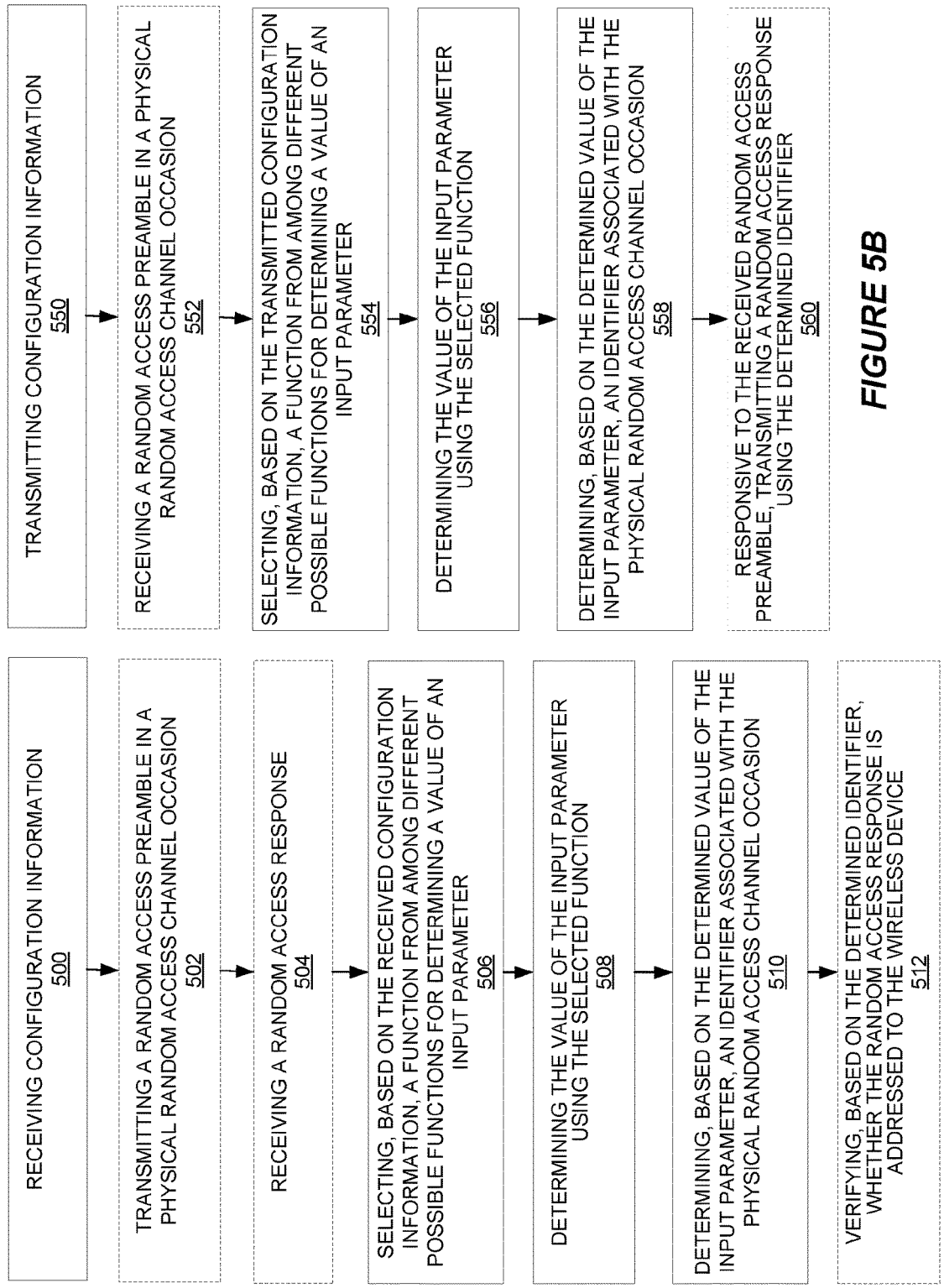
FIG. 5A is a logic flow diagram of a method performed by a wireless device according to other embodiments.
FIG. 5B is a logic flow diagram of a method performed by a network node according to other embodiments.

FIG. 5A depicts a method performed by a wireless device 14 in accordance with other particular embodiments, e.g., as described in FIG. 2. The method as shown may include receiving configuration information (e.g., system information) (Block 600). The method may also include transmitting a random access preamble 16 in a random access channel occasion 26 (e.g., a PRACH occasion) (Block 602). The method may further include receiving a random access response 18 (Block 604). In some embodiments (e.g., applicable to NR-U), the random access preamble 16 is transmitted, and/or the random access response 18 is received, in unlicensed frequency spectrum.

The method may further include selecting, based on the received configuration information, a function from among different possible functions for determining a value of an input parameter 30 (e.g., t_id, s_id, or ul_carrier) (Block 606).

The method may also include determining the value of the input parameter 30 using the selected function (Block 608). The method may further include determining (e.g., computing), as a function of the determined value, an identifier 24 (e.g., an RA-RNTI) associated with the random access channel occasion 26 in which the wireless device 14 transmitted the random access preamble 16 (Block 610). In some embodiments, the method further includes verifying, based on the determined identifier 24, whether the random access response 18 is addressed to the wireless device 14 (Block 612). Such verifying may for instance comprise verifying whether a cyclic redundancy check, CRC, of the random access response 18 is scrambled with the determined identifier 24.

Although not shown, the method in some embodiments may further include processing or discarding the random access response 18, depending respectively on whether the random access response 18 is or is not addressed to the wireless device 14 according to said verifying. Alternatively or additionally, the method may further include, based on the random access response 18 being addressed to the wireless device 14 according to said verifying, transmitting a connection request to a radio network node 12 from which the random access response 18 was received.

In some embodiments, the different possible functions include at least one function that defines the value of the input parameter 30 based on a system frame in which the random access channel occasion 26 starts. In one such embodiment, the at least one function defines the value of the input parameter also based on a first symbol of, or a first slot of, the random access channel occasion. In this case, said selecting may comprise selecting at least one function that defines the value of the input parameter based on a system frame in which the random access channel occasion starts, and determining the value of the input parameter comprises: selecting, from among multiple different subsets of possible values for the input parameter, a subset of possible values for the input parameter based on the system frame in which the random access channel occasion starts; and determining, from the possible values within the selected subset, the value for the input parameter based on a first symbol of, or the first slot of, the random access channel occasion.

In some embodiments, the different subsets are respectively associated with different possible values of SFN mod N, where SFN is an index of the system frame in which the random access channel occasion starts, and where N is a maximum duration of a random access response window in terms of a number of system frames. In this case, said selecting may comprise computing y=SFN mod N and selecting the subset of possible values for the input parameter based on y. In one such embodiment, N is 2 such that y=0 when the index of the system frame in which the random access channel occasion starts is even and y=1 when the index of the system frame in which the random access channel occasions starts is odd.

In other embodiments, said selecting is further based on a system frame in which the random access response is received. In one such embodiment, said selecting comprises: determining a number D of system frames between the system frame in which the random access channel occasion starts and the system frame in which the random access response is received; and selecting the subset of possible values based on the determined number D, wherein different subsets are respectively associated with different possible values for D given a duration of a random access response window. For example, determining the number D may comprise determining a duration between when the random access channel occasion starts and when the random access response was received, and dividing the determined duration by a duration of a system frame.

In some embodiments, the at least one function defines the value of the input parameter as a function of whether the random access preamble was transmitted in the same system frame as a system frame in which the random access response was received.

Alternatively or additionally, the at least one function defines the value of the input parameter as a function of an index of the first slot of the random access channel occasion in a system frame. In one such embodiment, the identifier is a random access radio network temporary identifier, RA-RNTI, wherein according to the at least one function the RA-RNTI is determined as:

$$RA\text{-}RNTI = 1 + s\_id + 14 \times t\_id + 14 \times 80 \times f\_id + 14 \times 80 \times 8 \times ul\_carrier\_id$$

where the input parameter is t_id, and where s_id is the index of the first OFDM symbol of the random access channel occasion, f_id is the index of the random access channel occasion in the frequency domain, and ul_carrier_id is the uplink carrier used for transmission of the random access preamble.

In other embodiments, the at least one function defines the value of the input parameter as a function of an index of the first symbol of the random access channel occasion. In one such embodiment, the identifier is a random access radio network temporary identifier, RA-RNTI, wherein the RA-RNTI is determined as:

$$RA\text{-}RNTI = 1 + s\_id + 14 \times t\_id + 14 \times 80 \times f\_id + 14 \times 80 \times 8 \times ul\_carrier\_id$$

wherein the input parameter is s_id, and wherein t_id is the index of the first slot of the random access channel occasion in a system frame, f_id is the index of the random access channel occasion in the frequency domain, and ul_carrier_id is the uplink carrier used for transmission of the random access preamble.

In some embodiments, a range of possible values for the input parameter may support indexing a maximum number of slots in a system frame, where the configuration information indicates a value for a configurable parameter, and where the number of slots in a system frame depends on the value for the configurable parameter.

In some embodiments, the configuration information indicates whether a supplementary uplink, SUL, carrier is configured. In this case, said selecting may comprise selecting at least one function that defines the value of the input parameter based on a system frame in which the random access channel occasion starts, based on the configuration information indicating that no SUL carrier is configured.

In some embodiments, the identifier is a random access radio network temporary identifier, RA-RNTI, wherein the RA-RNTI is determined as:

$$RA\text{-}RNTI = 1 + s\_id + 14 \times t\_id + 14 \times 80 \times f\_id + 14 \times 80 \times 8 \times ul\_carrier\_id$$

wherein the input parameter is ul_carrier_id, wherein s_id is an index of a first OFDM symbol of the random access channel occasion, wherein t_id is an index of a first slot of the random access channel occasion in a system frame, f_id is an index of the random access channel occasion in the frequency domain.

In some embodiments, a random access response window has a duration greater than a duration of a system frame.

In other embodiments, a range of possible values for the input parameter supports indexing a maximum number of symbols in a slot. In this case, the configuration information may indicate a value for a configurable parameter. And in which symbol the random access channel occasion is allowed to start depends on the value for the configurable parameter.

In some embodiments, the configuration information indicates a subcarrier spacing. In this case, such selection may comprise selecting at least one function that defines the value of the input parameter 30 based on a system frame in which the random access channel occasion 26 starts, based on the subcarrier spacing indicated by the configuration information being below a maximum supported subcarrier spacing (e.g., below 120 kHz). Alternatively or additionally, in some embodiments, the configuration information indicates a random access channel configuration index. In this case, such selection may comprise selecting at least one function that defines the value of the input parameter 30 based on a system frame in which the random access channel occasion 26 starts, based on the random access channel configuration index indicating a random access channel configuration that limits in which symbol the random access channel occasion 26 is allowed to start.

FIG. 5B depicts a method performed by a network node 12 in accordance with other particular embodiments, e.g., as described in FIG. 2. The method as shown may include transmitting configuration information (e.g., system information) (Block 650). The method may also include receiving a random access preamble 16 in a random access channel occasion 26 (e.g., a PRACH occasion) (Block 652).

The method may further include selecting, based on the transmitted configuration information, a function from among different possible functions for determining a value of an input parameter 30 (e.g., t_id, s_id, or ul_carrier) (Block 654). In some embodiments, the different possible functions include at least one function that defines the value of the input parameter 30 based on a system frame in which the random access channel occasion 26 starts.

In some embodiments, the configuration information indicates a subcarrier spacing. In this case, such selection may comprise selecting at least one function that defines the value of the input parameter 30 based on a system frame in which the random access channel occasion 26 starts, based on the subcarrier spacing indicated by the configuration information being below a maximum supported subcarrier spacing (e.g., below 120 kHz). Alternatively or additionally, in some embodiments, the configuration information indicates a random access channel configuration index. In this case, such selection may comprise selecting at least one function that defines the value of the input parameter 30 based on a system frame in which the random access channel occasion 26 starts, based on the random access channel configuration index indicating a random access channel configuration that limits in which symbol the random access channel occasion 26 is allowed to start.

Regardless, the method may also include determining the value of the input parameter 30 using the selected function (Block 656). The method may further include determining (e.g., computing), as a function of the determined value, an identifier 24 (e.g., an RA-RNTI) associated with the random access channel occasion 26 (Block 658). In some embodiments, the method further includes, responsive to the received random access preamble 16, transmitting a random access response 18 using the determined identifier 24 (Block 660). In one embodiment, said transmitting comprises scrambling a cyclic redundancy check, CRC, of the random access response using the determined identifier and transmitting the random access response with the CRC of the random access response scrambled.

In some embodiments (e.g., applicable to NR-U), the random access preamble 16 is received, and/or the random access response 18 is transmitted, in unlicensed frequency spectrum. In these and other embodiments, the method may also include performing a listen-before-talk, LBT, procedure or a clear channel assessment, CCA, before transmitting the random access response 18.

In some embodiments, a range of possible values for the input parameter may support indexing a maximum number of slots in a system frame, where the configuration information indicates a value for a configurable parameter, and where the number of slots in a system frame depends on the value for the configurable parameter.

In some embodiments, a range of possible values for the input parameter supports indexing a maximum number of symbols in a slot. In this case, the configuration information may indicate a value for a configurable parameter. And in which symbol the random access channel occasion is allowed to start depends on the value for the configurable parameter.

In some embodiments, the at least one function defines the value of the input parameter also based on a first symbol of, or a first slot of, the random access channel occasion. In one such embodiment, said selecting comprises selecting at least one function that defines the value of the input parameter based on a system frame in which the random access channel occasion starts, and wherein determining the value of the input parameter comprises: selecting, from among multiple different subsets of possible values for the input parameter, a subset of possible values for the input parameter based on the system frame in which the random access channel occasion starts; and determining, from the possible values within the selected subset, the value for the input parameter based on a first symbol of, or the first slot of, the random access channel occasion.

In one embodiment, the different subsets are respectively associated with different possible values of SFN mod N, where SFN is an index of the system frame in which the random access channel occasion starts, and where N is a maximum duration of a random access response window in terms of a number of system frames, and wherein said selecting comprises computing y=SFN mod N and selecting the subset of possible values for the input parameter based on y. For example, in one embodiment, N is 2 such that y=0 when the index of the system frame in which the random access channel occasions starts is even and y=1 when the index of the system frame in which the random access channel occasions starts is odd.

In another embodiment, said selecting is further based on a system frame in which the random access response is to be transmitted. In this case, said selecting may comprise: determining a number D of system frames between the system frame in which the random access channel occasion starts and the system frame in which the random access response is to be transmitted; and selecting the subset of possible values based on the determined number D, wherein different subsets are respectively associated with different possible values for D given a duration of a random access response window. In one embodiment, for example, determining the number D comprises determining a duration between when the random access channel occasion starts and when the random access response is to be transmitted, and dividing the determined duration by a duration of a system frame.

In some embodiments, the at least one function defines the value of the input parameter as a function of whether the random access preamble was received in the same system frame as a system frame in which the random access response is to be transmitted.

In some embodiments, the at least one function defines the value of the input parameter as a function of an index of the first slot of the random access channel occasion in a system frame. In one such embodiment, the identifier is a random access radio network temporary identifier, RA-RNTI, wherein according to the at least one function the RA-RNTI is determined as:

$$\text{RA-RNTI}=1+s\_id+14 \times t\_id+14 \times 80 \times f\_id+14 \times 80 \times 8 \times ul\_carrier\_id$$

wherein the input parameter is t_id, and wherein s_id is the index of the first OFDM symbol of the random access channel occasion, f_id is the index of the random access channel occasion in the frequency domain, and ul_carrier_id is the uplink carrier used for transmission of the random access preamble.

In other embodiments, the at least one function defines the value of the input parameter as a function of an index of the first symbol of the random access channel occasion. In one such embodiment, the identifier is a random access radio network temporary identifier, RA-RNTI, wherein the RA-RNTI is determined as:

$$\text{RA-RNTI}=1+s\_id+14 \times t\_id+14 \times 80 \times f\_id+14 \times 80 \times 8 \times ul\_carrier\_id$$

wherein the input parameter is s_id, and wherein t_id is the index of the first slot of the random access channel occasion in a system frame, f_id is the index of the random access channel occasion in the frequency domain, and ul_carrier_id is the uplink carrier used for transmission of the random access preamble.

In some embodiments, a range of possible values for the input parameter supports indexing different carriers on which the random access preamble is transmittable, wherein the configuration information indicates a value for a configurable parameter, and wherein on which one or more carriers the random access preamble is transmittable depends on the value for the configurable parameter.

In some embodiments, the configuration information indicates whether a supplementary uplink, SUL, carrier is configured, and wherein said selecting comprises selecting at least one function that defines the value of the input parameter based on a system frame in which the random access channel occasion starts, based on the configuration information indicating that no SUL carrier is configured.

In some embodiments, the identifier is a random access radio network temporary identifier, RA-RNTI, wherein the RA-RNTI is determined as:

$$\text{RA-RNTI} = 1 + s\_id + 14 \times t\_id + 14 \times 80 \times f\_id + 14 \times 80 \times 8 \times ul\_carrier\_id$$

wherein the input parameter is ul_carrier_id, wherein s_id is an index of a first OFDM symbol of the random access channel occasion, wherein t_id is an index of a first slot of the random access channel occasion in a system frame, f_id is an index of the random access channel occasion in the frequency domain.

In some embodiments, a random access response window has a duration greater than a duration of a system frame.

Figure 6:
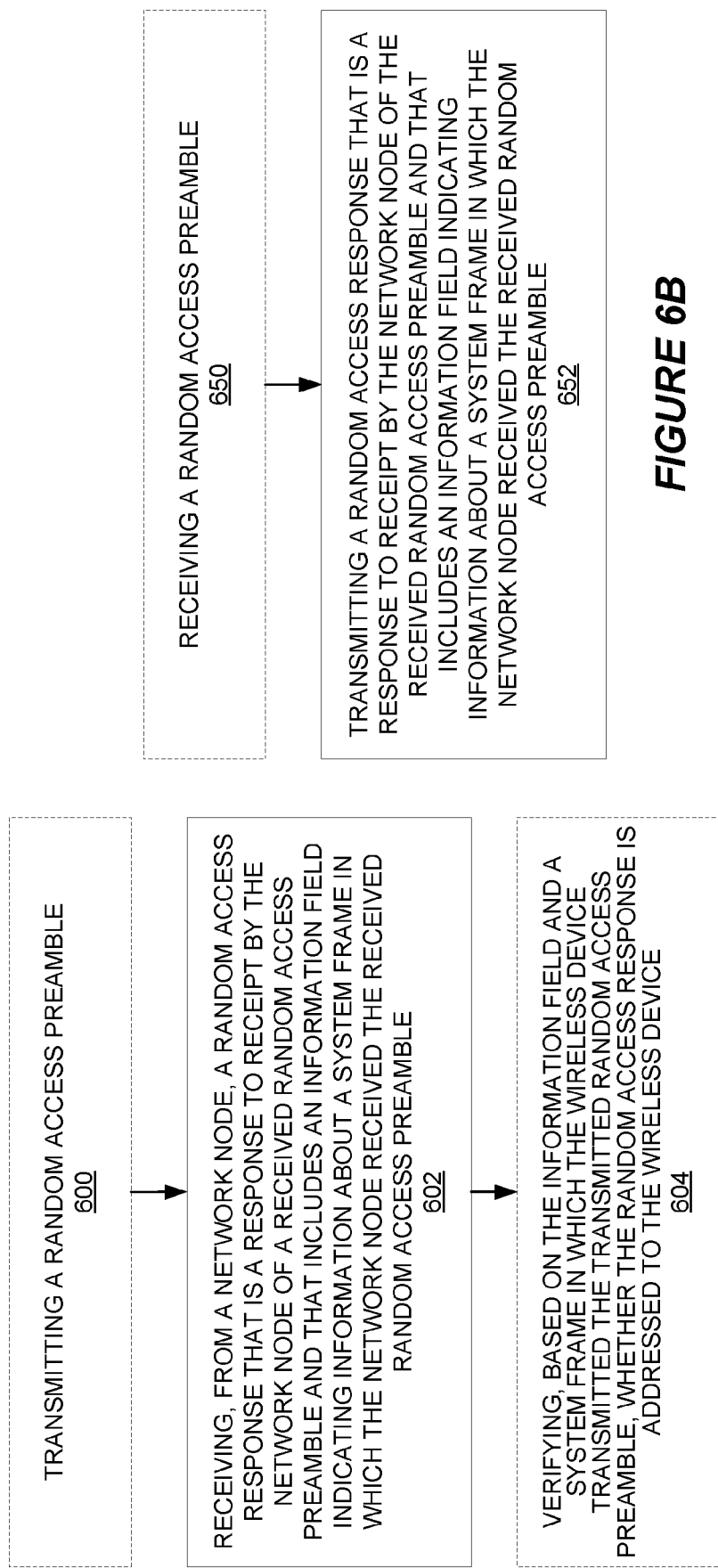
FIG. 6A is a logic flow diagram of a method performed by a wireless device according to still other embodiments.
FIG. 6B is a logic flow diagram of a method performed by a network node according to still other embodiments.

FIG. 6A depicts a method performed by a wireless device 14 in accordance with other particular embodiments, e.g., as described in FIG. 3. The method may include transmitting a random access preamble 16, e.g., in a random access channel occasion 26 (e.g., a PRACH occasion) (Block 700). The method may further include receiving, from a network node 12, a random access response 18 that is a response to receipt by the network node 12 of a received random access preamble 16 and that includes an information field indicating information about a system frame in which the network node 12 received the received random access preamble 16 (Block 702). The information field may for instance be a reserved (R) bit field, a timing advance command field, an uplink grant field, or a temporary C-RNTI field. In some embodiments (e.g., applicable to NR-U), the random access preamble 16 is transmitted, and/or the random access response 18 is received, in unlicensed frequency spectrum.

Regardless, the method may also include verifying, based on the information field and a system frame in which the wireless device 14 transmitted the transmitted random access preamble 16, whether the random access response 18 is addressed to the wireless device 14 (Block 704). For example, in some embodiments, verification entails determining, from the information field, the system frame in which the network node 12 received the received random access preamble 16. Verification may also involve verifying whether or not the random access response 18 is addressed to the wireless device 14 based, at least in part, on whether or not the system frame in which the network node 12 received the received random access preamble 16 according to said determining is the same as the system frame in which the wireless device 14 transmitted the transmitted random access preamble 16. In any event, such verifying may also be based on whether a cyclic redundancy check, CRC, of the random access response 18 is scrambled with an identifier 24 (e.g., RA-RNTI) associated with the random access channel occasion 26 in which the wireless device 14 transmitted the random access preamble 16.

Although not shown, the method in some embodiments may further include processing or discarding the random access response 18, depending respectively on whether the random access response 18 is or is not addressed to the wireless device 14 according to said verifying. Alternatively or additionally, the method may further include, based on the random access response 18 being addressed to the wireless device 14 according to said verifying, transmitting a connection request to a radio network node 12 from which the random access response 18 was received.

In some embodiments, the information field indicates a value of y=SFNy mod N, where SFNy is an index of the system frame in which the network node received the received random access preamble, and where N is a maximum duration of a random access response window in terms of a number of system frames. In one embodiment, for example, N is 2 such that y=0 when the index of the system frame in which the network node received the received random access preamble is even and y=1 when the index of the system frame in which the network node received the received random access preamble is odd. Alternatively or additionally, said verifying comprises: determining a value of x=SFNx mod N, where SFNx is an index of the system frame in which the wireless device transmitted the transmitted random access preamble; and determining whether the random access response is addressed to the wireless device based on whether x=y.

In other embodiments, the information field indicates a number Dy of system frames between the system frame in which the network node received the received random access preamble and the system frame in which the network node transmitted the random access response. In one such embodiment, Dy is equal to a response delay d_y divided by a duration of a system frame, and d_y equals a delay between when the network node received the received random access preamble and when the network node transmitted the random access response. Alternatively or additionally, said verifying comprises: determining a number Dx of system frames between the system frame in which the wireless device transmitted the transmitted random access preamble and the system frame in which the wireless device received the random access response; and determining whether the random access response is addressed to the wireless device based on whether Dx equals Dy as indicated by the information field. In one such embodiment, the method further comprises determining Dx as being equal to a response delay d_x divided by a duration of a system frame, wherein d_x equals a delay between when the wireless device transmitted the transmitted random access preamble and when the wireless device received the random access response.

In some embodiments, a random access response window has a duration greater than a duration of a system frame.

FIG. 6B depicts a method performed by a network node 12 in accordance with other particular embodiments, e.g., as described in FIG. 3. The method may include receiving a random access preamble 16, e.g., in a random access channel occasion 26 (e.g., a PRACH occasion) (Block 750).

In some embodiments, the method further includes transmitting a random access response 18 that is a response to receipt by the network node 12 of the received random access preamble 16 and that includes an information field indicating information about a system frame in which the network node 12 received the received random access preamble 16 (Block 752). The information field may for instance be a reserved (R) bit field, a timing advance command field, an uplink grant field, or a temporary C-RNTI field.

In some embodiments (e.g., applicable to NR-U), the random access preamble 16 is received, and/or the random access response 18 is transmitted, in unlicensed frequency spectrum. In these and other embodiments, the method may also include performing a listen-before-talk, LBT, procedure or a clear channel assessment, CCA, before transmitting the random access response 18.

In some embodiments, the information field indicates a value of y=SFNy mod N, where SFNy is an index of the system frame in which the network node received the received random access preamble, and where N is a maximum duration of a random access response window in terms of a number of system frames. In one such embodiment, N is 2 such that y=0 when the index of the system frame in which the network node received the received random access preamble is even and y=1 when the index of the system frame in which the network node received the received random access preamble is odd.

In other embodiments, the information field indicates a number Dy of system frames between the system frame in which the network node received the received random access preamble and the system frame in which the network node transmitted the random access response. In one such embodiment, Dy is equal to a response delay d_y divided by a duration of a system frame, wherein d_y equals a delay between when the network node received the received random access preamble and when the network node transmitted the random access response.

In some embodiments, a random access response window has a duration greater than a duration of a system frame.

In some embodiments, said transmitting comprises: scrambling a cyclic redundancy check, CRC, of the random access response using an identifier associated with the random access channel occasion in which the random access preamble was received; and transmitting the random access response with the CRC of the random access response scrambled.

In some embodiments, the identifier is a random access radio network temporary identifier, RA-RNTI.

Embodiments herein also include corresponding apparatuses. Embodiments herein for instance include a wireless device configured to perform any of the steps of any of the embodiments described above for the wireless device.

Embodiments also include a wireless device comprising processing circuitry and power supply circuitry. The processing circuitry is configured to perform any of the steps of any of the embodiments described above for the wireless device. The power supply circuitry is configured to supply power to the wireless device.

Embodiments further include a wireless device comprising processing circuitry. The processing circuitry is configured to perform any of the steps of any of the embodiments described above for the wireless device. In some embodiments, the wireless device further comprises communication circuitry.

Embodiments further include a wireless device comprising processing circuitry and memory. The memory contains instructions executable by the processing circuitry whereby the wireless device is configured to perform any of the steps of any of the embodiments described above for the wireless device.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node configured to perform any of the steps of any of the embodiments described above for the radio network node.

Embodiments also include a radio network node comprising processing circuitry and power supply circuitry. The processing circuitry is configured to perform any of the steps of any of the embodiments described above for the radio network node. The power supply circuitry is configured to supply power to the radio network node.

Embodiments further include a radio network node comprising processing circuitry. The processing circuitry is configured to perform any of the steps of any of the embodiments described above for the radio network node. In some embodiments, the radio network node further comprises communication circuitry.

Embodiments further include a radio network node comprising processing circuitry and memory. The memory contains instructions executable by the processing circuitry whereby the radio network node is configured to perform any of the steps of any of the embodiments described above for the radio network node.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 7:
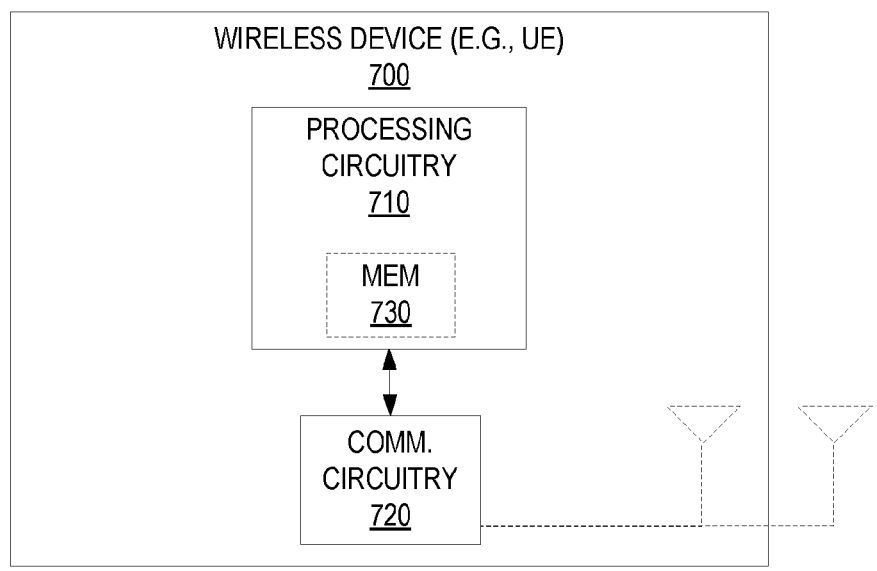
FIG. 7 is a block diagram of a wireless device according to some embodiments.

FIG. 7 for example illustrates a wireless device 700 (e.g., wireless device 14) as implemented in accordance with one or more embodiments. As shown, the wireless device 700 includes processing circuitry 710 and communication circuitry 720. The communication circuitry 720 (e.g., radio circuitry) is configured to transmit and/or receive information to and/or from one or more other nodes, e.g., via any communication technology. Such communication may occur via one or more antennas that are either internal or external to the wireless device 700. The processing circuitry 710 is configured to perform processing described above, e.g., in FIG. 4A, FIG. 5A, and/or FIG. 6A, such as by executing instructions stored in memory 730. The processing circuitry 710 in this regard may implement certain functional means, units, or modules.

Figure 8:
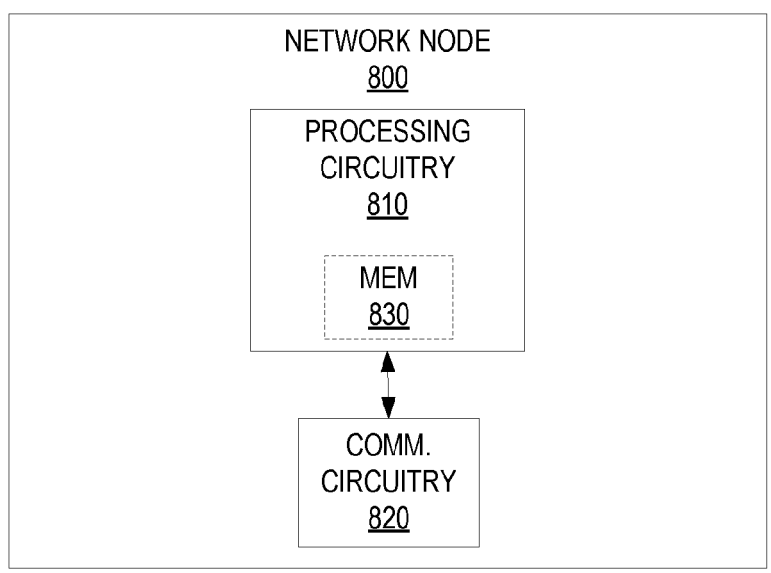
FIG. 8 is a block diagram of a network node according to some embodiments.

FIG. 8 illustrates a network node 800 (e.g., network node 12) as implemented in accordance with one or more embodiments. As shown, the network node 800 includes processing circuitry 810 and communication circuitry 820. The communication circuitry 820 is configured to transmit and/or receive information to and/or from one or more other nodes, e.g., via any communication technology. The processing circuitry 810 is configured to perform processing described above, e.g., in FIG. 4B, FIG. 5B, and/or FIG. 6B, such as by executing instructions stored in memory 830. The processing circuitry 810 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

The evolving 5G standard NR (New Radio) is aiming to operate in a wide range of frequencies from below 1 GHz up to 100 GHz. Allowing unlicensed networks, i.e., networks that operate in shared spectrum (or unlicensed spectrum) to effectively use the available spectrum is an attractive approach to increase system capacity. Although unlicensed spectrum does not match the qualities of the licensed regime, solutions that allow an efficient use of it as a complement to licensed deployments have the potential to bring great value to the 3GPP operators, and, ultimately, to the 3GPP industry as a whole. This type of solution would enable operators and vendors to leverage the existing or planned investments in LTE/NR hardware in the radio and core network. In the 3gpp SI NR-U is one example of unlicensed network operation.

Listen-before-talk (LBT) is designed for unlicensed spectrum co-existence with other radio access technologies (RATs). In this mechanism, a radio device applies a clear channel assessment (CCA) check before any transmission. The transmitter involves energy detection (ED) over a time period compared to a certain threshold (ED threshold) in order to determine if a channel is idle. In case the channel is determined to be occupied, the transmitter performs a random back-off within a contention window before its next CCA attempt. In order to protect the acknowledgement (ACK) transmissions, the transmitter must defer a period after each busy CCA slot prior to resuming back-off. As soon as the transmitter has grasped access to a channel, the transmitter is only allowed to perform transmission up to a maximum time duration (namely, the maximum channel occupancy time (MOOT)). For quality of service (QoS) differentiation, a channel access priority based on the service type has been defined. For example, there are four LBT priority classes defined for differentiation of contention window sizes (CWS) and MOOT between services.

The NR random access procedure comes in two forms, allowing access to be either contention-based (implying an inherent risk of collision) or contention-free. In contention-based random access, a preamble is randomly chosen by the user equipment (UE), which may result in more than one UE simultaneously transmitting the same preamble, leading to a need for a subsequent contention resolution process.

Figure 9:
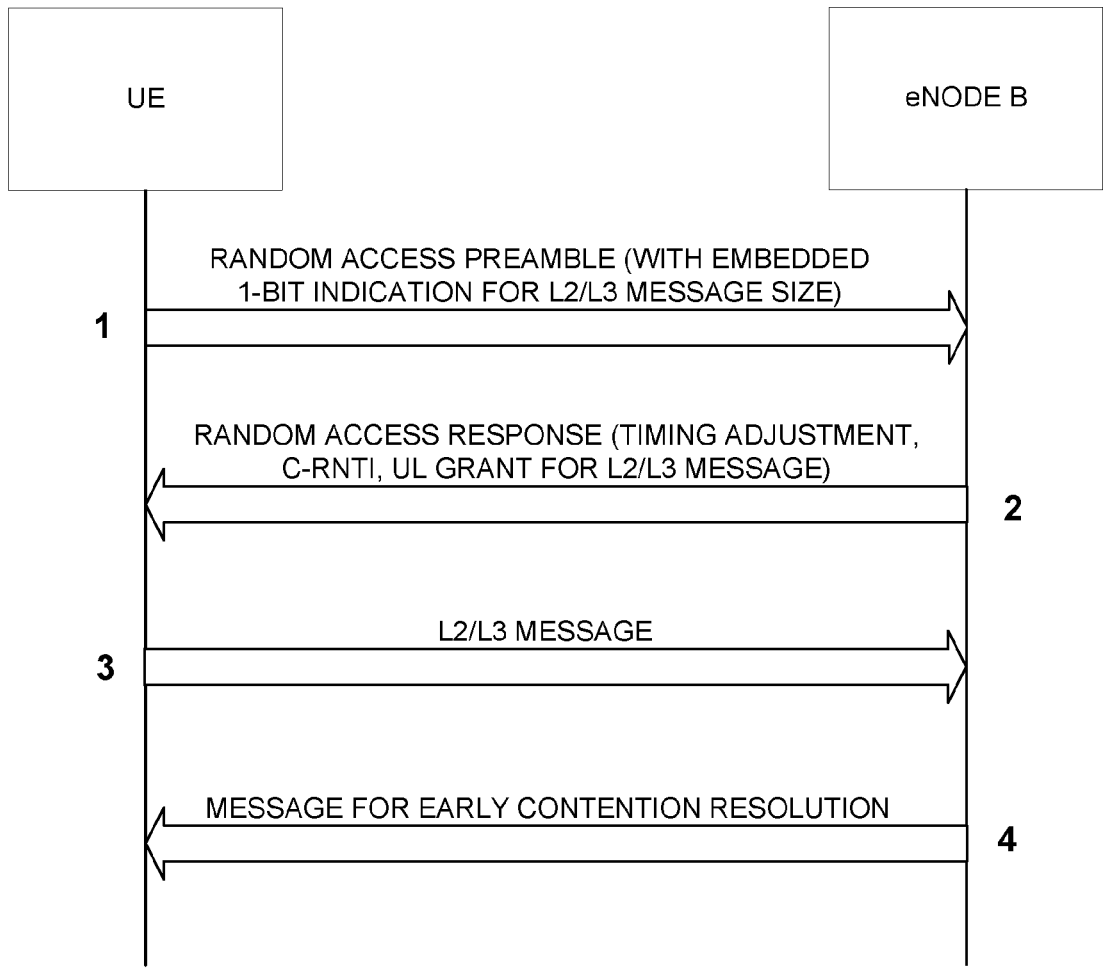
FIG. 9 is a call flow diagram of contention-based random access procedure according to some embodiments.

As shown in FIG. 9, the contention-based procedure consists of four-steps: (i) Preamble transmission; (ii) Random access response; (iii) Transmission of message 3 (MSG3); and (iv) Contention resolution message.

Preamble transmission: The UE selects one of the 64-Z physical random access channel (PRACH) contention-based sequences (where Z is the Number allocation for contention-free preambles allocated by the eNodeB). The set of contention-based signatures is further subdivided into two subgroups, so that the choice of preamble can carry one bit of information relating to the amount of transmission resource needed to transmit Message 3. The broadcast system information indicates which signatures are in each of the two subgroups (each subgroup corresponding to one value of the one bit of information), as well as the meaning of each subgroup. The UE selects a sequence from the subgroup corresponding to the size of transmission resource needed for the appropriate RACH use case (some use cases require only a few bits to be transmitted in MSG3, so choosing the small message size avoids allocating unnecessary uplink resources). The time and frequency resource (PRACH occasion) used to transmit the preamble is used to compute the random access radio network temporary identifier 24 (RA-RNTI) which is needed to identify the random access response (RAR) transmission.

Random Access Response (RAR): The RAR conveys the identity of the detected preamble (RAPID), a timing alignment (TA) instruction to synchronize subsequent uplink transmissions from the UE, an initial uplink resource grant for transmission of the Step 3 message, and an assignment of a temporary Cell Radio Network Temporary Identifier (C-RNTI) (which may or may not be made permanent as a result of the next step—contention resolution). The RAR is also scrambled with the RA-RNTI and indicates the PRACH occasion when the preamble was transmitted. The UE expects to receive the RAR within a time window (RAR window), of which the start and end are configured by the eNodeB and broadcast as part of the cell-specific system information. In NR, the maximum length of the RAR window is 10 ms. If the UE does not receive a RAR within the configured time window, it selects another sequence to be transmitted again.

Message 3 transmission: This message is the first scheduled uplink transmission on the physical uplink shared channel (PUSCH) and makes use of hybrid automatic repeat request (HARQ). It is addressed to the temporary C-RNTI allocated in the RAR. In case of a preamble collision having occurred at Step 1, the colliding UEs will receive the same temporary C-RNTI through the RAR and will also collide in the same uplink time-frequency resources when transmitting their L2/L3 message. This may result in such interference that no colliding UE can be decoded, and the UEs restart the random access procedure after reaching the maximum number of HARQ retransmissions. However, if one UE is successfully decoded, the contention remains unresolved for the other UEs. The following downlink message (in Step 4) allows a quick resolution of this contention.

Contention-resolution: The contention resolution message uses HARQ. It is addressed to the C-RNTI (if indicated in the MSG.3 message) or to the temporary C-RNTI, and, in the latter case, echoes the UE identity contained in MSG.3. In case of a collision followed by successful decoding of the MSG.3, the HARQ feedback is transmitted only by the UE which detects its own UE identity (or C-RNTI); other UEs understand there was a collision, transmit no HARQ feedback, and can quickly exit the current random access procedure and start another one.

According to 3GPP specification 38.321-f30, the RA-RNTI associated with the PRACH in which the Random access preamble 16 is transmitted, is computed as:

$$RA\text{-}RNTI = 1 + s\_id + 14 \times t\_id + 14 \times 80 \times f\_id + 14 \times 80 \times 8 \times ul\_carrier\_id$$

where s_id is the index of the first OFDM symbol of the specified PRACH (0≤s_id<14), t_id is the index of the first slot of the specified PRACH in a system frame (0≤t_id<80), f_id is the index of the specified PRACH in the frequency domain (0≤f_id<8), and ul_carrier_id is the UL carrier used for Msg1 transmission (0 for NUL carrier, and 1 for SUL carrier). Note that, although the above language from 38.321-f30 refers to PRACH, the language may alternatively be modified to refer to PRACH occasion, e.g., such that the RA-RNTI is associated with the PRACH occasion in which the random access preamble is transmitted. This may similarly extend to other references to the PRACH vs. PRACH occasion herein.

The range of values of t_id is defined to handle sub-carrier spacing (SCS) up to 120 kHz (80 slots per radio frame in this case). It should be noted that the maximum allowed length of the RAR window is 10 ms.

In NR-U, the UE (and gNB) faces the issue of LBT failure both for UL and DL transmissions. In case there is LBT failure, the UL or DL transmission is delayed since the UE or gNB needs to do a new transmission attempt. This has led to the observation that if the RAR transmissions are delayed due to DL LBT, the UE may not receive the RAR in case the RAR window expires. Accordingly, a RAR window longer than 10 ms may need to be allowed.

Figure 10:
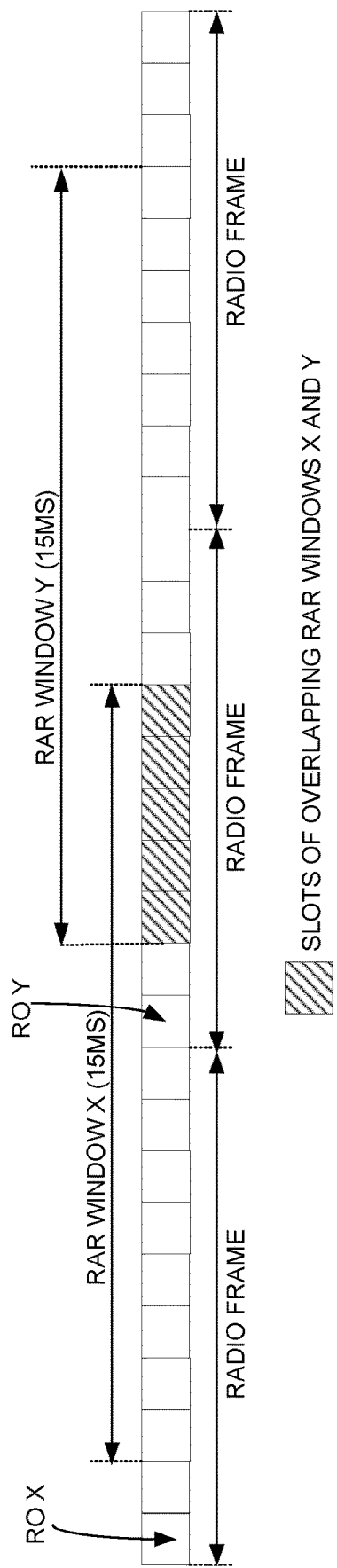
FIG. 10 is a block diagram of radio frames in which a random access response may be transmitted according to some embodiments.

There currently exist certain challenge(s). Expanding the RA-RNTI to be valid for longer than 10 ms would need some indication on which radio frame the associated PRACH preamble is transmitted. This is so because it is not clear whether the indicated slot belongs to the current radio frame or the previous radio frame. This is illustrated in FIG. 10, which shows an example when RAR for preamble transmissions in first slot in different radio frames can be transmitted simultaneously. In FIG. 10, if PRACH is transmitted using the same random access preamble in RACH occasion (RO) X and RO Y by UE 1 and UE2, the RAR cannot be distinguished as RA-RNTI is the same for RO X and RO Y.

This means that the current NR RA-RNTI calculation is ambiguous and cannot be used to distinguish different preamble transmissions in the same slot number in different radio frames in case the RAR window is extended to be over than 10 ms, which was the window length in NR licensed.

In NR unlicensed (NR-U) spectrum, if the existing RAR window is extended (beyond 10 ms) to overcome the LBT failures, the formula of existing RA-RNTI must be updated accordingly.

One method to expand the RA-RNTI definition is to introduce a new variable which indicates which radio frame the slot belongs to. An example is given in R2-1816312 according to:

$$RA\text{-}RNTI = 1 + s\_id + 14 * t\_id + 14 * 80 * f\_id + 14 * 80 * 8 * ul\_carrier\_id + 14 * 80 * 8 * 2 * frame\_id$$

where,
frame_id=SFN mod frame_id_max
frame_id_max=Max RAR monitoring duration in radio frames
SFN Id is SFN of radio frame in which PRACH occasion starts;

The problem with this method is that it expands the RA-RNTI value space, from xx to yy. This means that there will be an increased computational burden and complexity on the UE and gNB and increased risk of miss-detection. Therefore, it is an objective to find means on how to update RA-RNTI calculation to fit with potential longer RAR window length, while at the same time, keeping the value space of RA-RNTI as low as possible.

Certain aspects of the present disclosure and their embodiments may provide solutions to these or other challenges. Some embodiments describe methods to indicate SFN in the RA-RNTI to allow longer RAR windows. This may be done for example by coding un-used value space in the t_id or s_id or ul_carrier_id in the RA-RNTI to indicate SFN. Other embodiments indicate this in the RAR.

Some embodiments are based on an assumption that in NR-U, due to the restriction of the deployment frequency band, there may be certain high SCS values (such as 60 kHz, or 120 kHz) that are not applicable to NR-U, which gives unused bits in the t_id space. Also for the s_id space, there may be unused bits for most PRACH configurations in NR-U. There may be unused s_id space also due to the fact that NR-U may not support all PRACH preamble formats. Given that small cells are targeted for NR-U deployment, some formats that are designed for rather large cells can be excluded for NR-U.

Certain embodiments may provide one or more of the following technical advantage(s). Some embodiments can solve the RAR ambiguity due to longer RAR windows without having an ambiguous RA-RNTI or increasing the RA-RNTI space. This lowers the computational burden in UE and gNB and decreases miss-detection probabilities.

Various embodiments for RA-RNTI generation to allow a longer RAR window for NR-U are described below. The below embodiments are described in the context of NR-U. However, similar embodiments are also applicable to other scenarios where the RA-RNTI needs to be extended.

In the first embodiment (Embodiment 1), in case specific PRACH Msg1 SCS values are not used (e.g., due to requirements of frequency domain channel interlaced structure) in a cell, the unused tid spaces can be reused to indicate the SFN index. In one example, it is only the values 15, or 30 or 60 kHz that are configured for PRACH. In this case, the t_id numbers after 39 (i.e., values in the range between 40 and 79) are also used to indicate SFN. In this case, [0,39] are used to indicate slots in even SFNs. Then if the RA-RNTI refers to slot k in an even SFN, then t_id=k is used. If the RA-RNTI refers to slot k in an odd SFN, then t_id=k+40 is used. This allows a RAR window length of 20 ms to be supported for SCS up to 60 kHz. This gives a t_id space of [0,39] for even SFNs and of [40,79] for odd SFNs.

Figure 11:
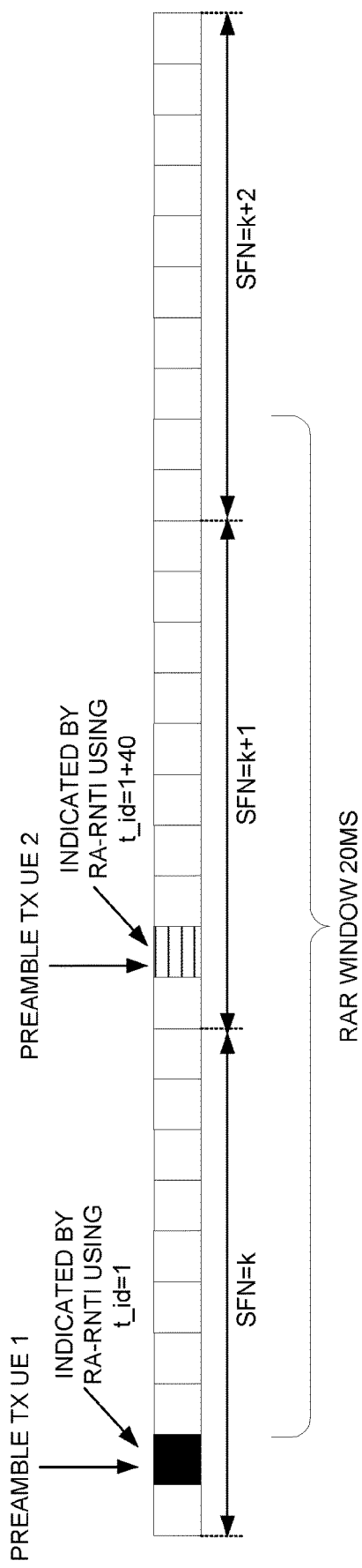
FIG. 11 is a block diagram illustrating random access radio network temporary identifier (RA-RNTI) generation according to some embodiments.

An example of this Embodiment 1 is shown in FIG. 11, where different t_ids are used for the same slot number depending on if the SFN is even or odd. In this example, SCS=15 kHz (1 ms slot length) and a RAR window length of 20 ms is shown. In the example, k is an even number.

In another example, it is the values 15 or 30 kHz that are configured for PRACH. In this case, the tid value range between 20 and 79 would be able to be reused to indicate SFN indices. In this case, this allows the RAR window length to be extended to up to 40 ms.

In a second embodiment (Embodiment 2), alternatively or additionally to the first embodiment, in case the SCS values 15, 30, and 60 kHz are configured for PRACH in a cell, the t_id numbers after 39 can be used to indicate SFN. In this case, [0,39] are used to indicate slot less or equal than 10 ms prior to the RAR is transmitted. Then if the RA-RNTI refers to slot k in an SFN, t_id=k is used. If the RA-RNTI refers to slot k in in an SFN where this slot is more than 10 ms prior to the RAR is transmitted, then t_id=k+40 is used. This allows a RAR window length of 20 ms to be supported for SCS up to 60 kHz. This gives a t_id space of [0,39] for RARs referring to slots in the same SFN as the RAR is transmitted and of [40,79] for RARs referring to slots in the SFN before the RAR is transmitted.

This Embodiment 2 is illustrated in FIG. 12, where again SCS=15 kHz (1 ms slot length) and a RAR window length of 20 ms is shown. Here, different t_ids are used for the same slot number depending the timing between the preamble transmission and the RAR transmission. The preamble transmitted by UE1 is indicated by a RA-RNTI using t_id=1 if the RAR is transmitted less or equal to 10 ms after the preamble transmission. If the RAR is transmitted more than 10 ms after the preamble transmission, it is indicated by a RA-RNTI using t_id=1+40. A similar methodology is also applicable to the case where the SCS values 15, 30 kHz are configured for PRACH in a cell.

In a third embodiment (Embodiment 3), the unused s_id number space is used to indicate SFN. The used s_id numbers can be obtained from the PRACH configuration (prach-ConfigurationIndex in RACH-ConfigGeneric) combined with the Random access configurations in TS 38.211. For example, in Table 6.3.3.2-3: Random access configurations for frequency range 1 (FR1) and unpaired spectrum in 38.211, if PRACH configuration index 0 has been signalled, the starting symbol is 0. This means that the other starting symbols are unused and can be used to encode SFN. For example, similar to embodiment 1, s_id=0 is used to indicate slots in even SFNs. Then if the RA-RNTI refers to a slot in an even SFN, then s_id=0 is used. If the RA-RNTI refers to a slot in an odd SFN, then s_id=k (k>0) is used. The parameter k can be configured or hard coded per PRACH configuration index. This allows a RAR window length of 20 ms to be supported for SCS up to 60 kHz. In another example, given that small cells are targeted for NR-U deployment, some formats that are designed for rather large cells can be excluded for NR-U. This can give unused s_id value spaces.

In a fourth embodiment (Embodiment 4), the unused s_id numbers is also used to indicate SFN where the preamble is transmitted. Similar to embodiment 3, in case PRACH configuration index 0 has been signalled, and the starting symbol is 0m s_id=0 is used to indicate a slot in an SFN less or equal to 10 ms prior to the RAR is transmitted. Hence, if the RA-RNTI refers to a RO less than or equal to 10 ms prior to the RAR being transmitted, then s_id=0. If the RA-RNTI refers to a RO more than 10 ms prior to the RAR transmission, then s_id=k is used. Also in this case, the parameter k can be configured or hard coded per PRACH configuration index. This allows a RAR window length of 20 ms to be supported for SCS up to 60 kHz. In case the RAR window is extended to above 20 ms, there may be several k values for s_id that can be reused to indicate different radio frames with a RAR window.

In a fifth embodiment (Embodiment 5), in case there is not any supplementary uplink (SUL) carrier configured in a cell, the parameter ul_carrier_id in the existing RA-RNTI formula can be reused to indicate the SFN index, which allows the RAR window length to be extended to up to 20 ms. For example, the value 0 indicates an even radio frame in the RAR window, while the value 1 indicates an odd radio frame in a RAR window. In the second example, the value 1 indicates the first radio frame (first 10 ms of the RAR window) while the value 0 indicates the second radio frame (last 10 ms in the RAR window).

In a sixth embodiment (Embodiment 6), the RA-RNTI of NR is re-used and instead the indication of SFN is signaled in the RAR message. In one example, this means that the R bit in the RAR message is used to signal if the RAR refers to a preamble transmitted in an evenSFN (e.g. R=0) or an odd SFN (e.g. R=1). The R bit can also indicate the relative position of the preamble transmission relative the RAR transmission similar to the embodiments 2 and 4. The RAR message is depicted in FIG. 13 (from 38.321 f30).

In another example, a different unused field in the RAR may be used to carry an SFN index within the RAR window, e.g., an absolute or relative SFN index. For example, the Timing advance command field may be not used in some cases (such as the RA is not triggered for obtainment/update of UL sync, the existing TA value at the UE is still valid). Alternatively or additionally, other fields such as UL grant, or Temporary C-RNTI, may be not used in some scenarios.

Note that some embodiments herein may be enabled or depend on configuration information (e.g., system information) sent from the network to the wireless device. For example, a sub-carrier spacing may be defined in system information (msg1-SubcarrierSpacing Information element in RACH config-common). Depending on which value is configured, the UE can deduce how many tids (slots) there are per radio frame. The numbering always starts from 0, so above a certain number the tids are unused.

Similarly, number of sids is in msg1-FDM in RACH-ConfigGeneric. Numbers of UL carriers (1 or 2) is indicated by SUL in initialUplinkBWP.

Similarly, although some embodiments have been described with reference to the start of a random access channel occasion 26 (e.g., PRACH occasion), the embodiments may in some cases be equivalently described with reference to the start of the random access preamble transmission.

Moreover, as the UE moves from cell to cell, different cells may have different configurations (e.g., different sub-carrier spacings). If one cell's SCS is such that the full range of tid values is unused, embodiments 1 and 2 above can be exploited. However, if a different cell's SCS is such that the full range of tid values is used, a UE may for instance be configured to first check the cell's SCS and see if embodiment 1 or 2 is used, and if that can't be used then next check if embodiment 3 or 4 can be used. In other words, since the embodiments have different preconditions, the embodiments may be ranked by the UE and/or network in priority order so that they can be used as alternatives as needed.

Figure 14:
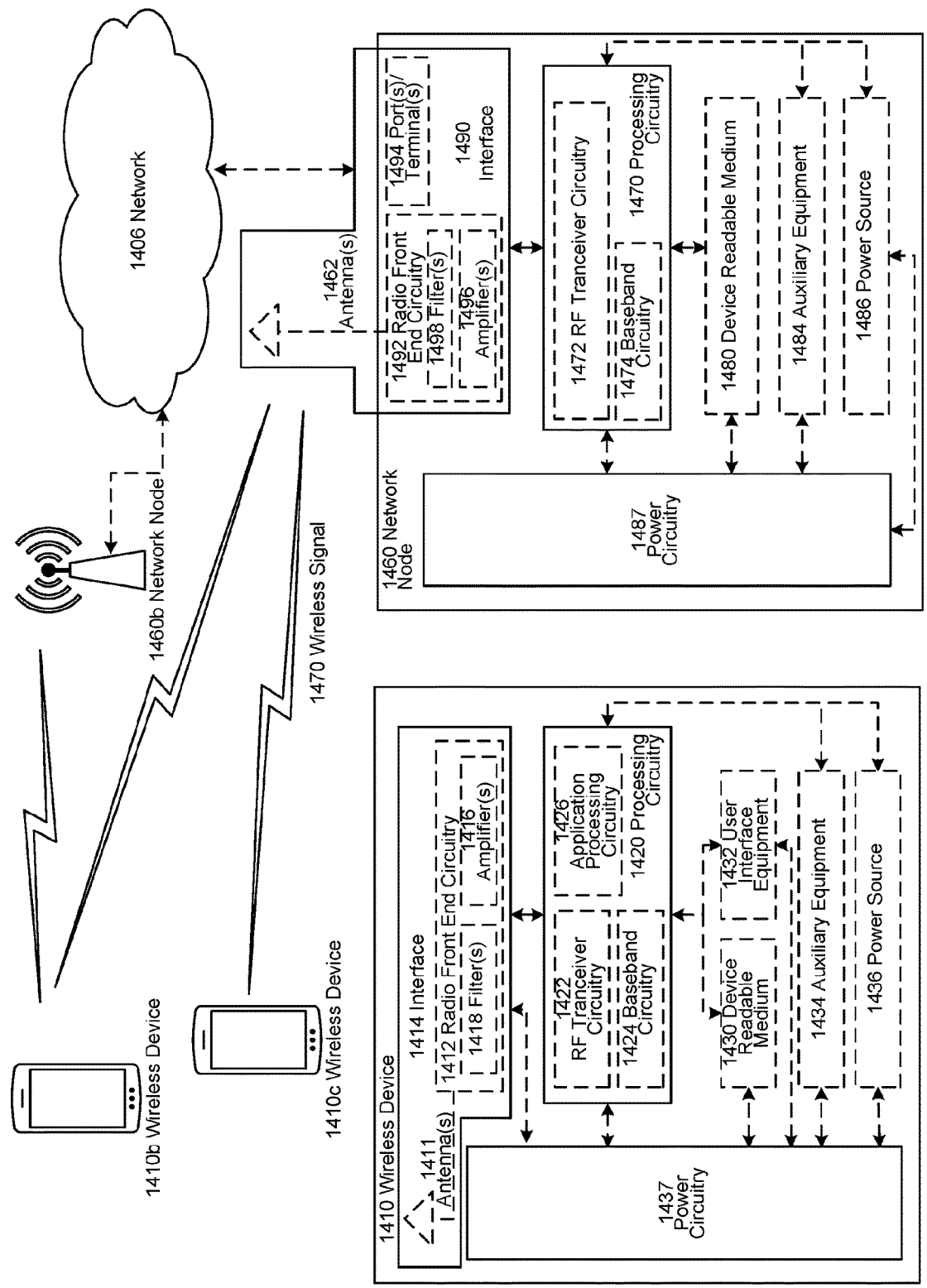
FIG. 14 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network 1406, network nodes 1460 and 1460*b*, and WDs 1410, 1410*b*, and 1410*c*. In practice, a wireless network may further include any additional elements suitable to support communication between wireless devices or between a wireless device and another communication device, such as a landline telephone, a service provider, or any other network node or end device. Of the illustrated components, network node 1460 and wireless device (WD) 1410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1460 and WD 1410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node 1460 includes processing circuitry 1470, device readable medium 1480, interface 1490, auxiliary equipment 1484, power source 1486, power circuitry 1487, and antenna 1462. Although network node 1460 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1460 are depicted as single boxes located within a larger box, or nested within multiple boxes, in practice, a network node may comprise multiple different physical components that make up a single illustrated component (e.g., device readable medium 1480 may comprise multiple separate hard drives as well as multiple RAM modules).

Similarly, network node 1460 may be composed of multiple physically separate components (e.g., a NodeB component and a RNC component, or a BTS component and a BSC component, etc.), which may each have their own respective components. In certain scenarios in which network node 1460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1460 may be configured to support multiple radio access technologies (RATs). In such embodiments, some components may be duplicated (e.g., separate device readable medium 1480 for the different RATs) and some components may be reused (e.g., the same antenna 1462 may be shared by the RATs). Network node 1460 may also include multiple sets of the various illustrated components for different wireless technologies integrated into network node 1460, such as, for example, GSM, WCDMA, LTE, NR, WiFi, or Bluetooth wireless technologies. These wireless technologies may be integrated into the same or different chip or set of chips and other components within network node 1460.

Processing circuitry 1470 is configured to perform any determining, calculating, or similar operations (e.g., certain obtaining operations) described herein as being provided by a network node. These operations performed by processing circuitry 1470 may include processing information obtained by processing circuitry 1470 by, for example, converting the obtained information into other information, comparing the obtained information or converted information to information stored in the network node, and/or performing one or more operations based on the obtained information or converted information, and as a result of said processing making a determination.

Processing circuitry 1470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1460 components, such as device readable medium 1480, network node 1460 functionality. For example, processing circuitry 1470 may execute instructions stored in device readable medium 1480 or in memory within processing circuitry 1470. Such functionality may include providing any of the various wireless features, functions, or benefits discussed herein. In some embodiments, processing circuitry 1470 may include a system on a chip (SOC).

In some embodiments, processing circuitry 1470 may include one or more of radio frequency (RF) transceiver circuitry 1472 and baseband processing circuitry 1474. In some embodiments, radio frequency (RF) transceiver circuitry 1472 and baseband processing circuitry 1474 may be on separate chips (or sets of chips), boards, or units, such as radio units and digital units. In alternative embodiments, part or all of RF transceiver circuitry 1472 and baseband processing circuitry 1474 may be on the same chip or set of chips, boards, or units In certain embodiments, some or all of the functionality described herein as being provided by a network node, base station, eNB or other such network device may be performed by processing circuitry 1470 executing instructions stored on device readable medium 1480 or memory within processing circuitry 1470. In alternative embodiments, some or all of the functionality may be provided by processing circuitry 1470 without executing instructions stored on a separate or discrete device readable medium, such as in a hard-wired manner. In any of those embodiments, whether executing instructions stored on a device readable storage medium or not, processing circuitry 1470 can be configured to perform the described functionality. The benefits provided by such functionality are not limited to processing circuitry 1470 alone or to other components of network node 1460, but are enjoyed by network node 1460 as a whole, and/or by end users and the wireless network generally.

Device readable medium 1480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1470. Device readable medium 1480 may store any suitable instructions, data or information, including a computer program, software, an application including one or more of logic, rules, code, tables, etc. and/or other instructions capable of being executed by processing circuitry 1470 and, utilized by network node 1460. Device readable medium 1480 may be used to store any calculations made by processing circuitry 1470 and/or any data received via interface 1490. In some embodiments, processing circuitry 1470 and device readable medium 1480 may be considered to be integrated.

Interface 1490 is used in the wired or wireless communication of signalling and/or data between network node 1460, network 1406, and/or WDs 1410. As illustrated, interface 1490 comprises port(s)/terminal(s) 1494 to send and receive data, for example to and from network 1406 over a wired connection. Interface 1490 also includes radio front end circuitry 1492 that may be coupled to, or in certain embodiments a part of, antenna 1462. Radio front end circuitry 1492 comprises filters 1498 and amplifiers 1496. Radio front end circuitry 1492 may be connected to antenna 1462 and processing circuitry 1470. Radio front end circuitry may be configured to condition signals communicated between antenna 1462 and processing circuitry 1470. Radio front end circuitry 1492 may receive digital data that is to be sent out to other network nodes or WDs via a wireless connection. Radio front end circuitry 1492 may convert the digital data into a radio signal having the appropriate channel and bandwidth parameters using a combination of filters 1498 and/or amplifiers 1496. The radio signal may then be transmitted via antenna 1462. Similarly, when receiving data, antenna 1462 may collect radio signals which are then converted into digital data by radio front end circuitry 1492. The digital data may be passed to processing circuitry 1470. In other embodiments, the interface may comprise different components and/or different combinations of components.

In certain alternative embodiments, network node 1460 may not include separate radio front end circuitry 1492, instead, processing circuitry 1470 may comprise radio front end circuitry and may be connected to antenna 1462 without separate radio front end circuitry 1492. Similarly, in some embodiments, all or some of RF transceiver circuitry 1472 may be considered a part of interface 1490. In still other embodiments, interface 1490 may include one or more ports or terminals 1494, radio front end circuitry 1492, and RF transceiver circuitry 1472, as part of a radio unit (not shown), and interface 1490 may communicate with baseband processing circuitry 1474, which is part of a digital unit (not shown).

Antenna 1462 may include one or more antennas, or antenna arrays, configured to send and/or receive wireless signals. Antenna 1462 may be coupled to radio front end circuitry 1490 and may be any type of antenna capable of transmitting and receiving data and/or signals wirelessly. In some embodiments, antenna 1462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1462 may be separate from network node 1460 and may be connectable to network node 1460 through an interface or port.

Antenna 1462, interface 1490, and/or processing circuitry 1470 may be configured to perform any receiving operations and/or certain obtaining operations described herein as being performed by a network node. Any information, data and/or signals may be received from a wireless device, another network node and/or any other network equipment. Similarly, antenna 1462, interface 1490, and/or processing circuitry 1470 may be configured to perform any transmitting operations described herein as being performed by a network node. Any information, data and/or signals may be transmitted to a wireless device, another network node and/or any other network equipment.

Power circuitry 1487 may comprise, or be coupled to, power management circuitry and is configured to supply the components of network node 1460 with power for performing the functionality described herein. Power circuitry 1487 may receive power from power source 1486. Power source 1486 and/or power circuitry 1487 may be configured to provide power to the various components of network node 1460 in a form suitable for the respective components (e.g., at a voltage and current level needed for each respective component). Power source 1486 may either be included in, or external to, power circuitry 1487 and/or network node 1460. For example, network node 1460 may be connectable to an external power source (e.g., an electricity outlet) via an input circuitry or interface such as an electrical cable, whereby the external power source supplies power to power circuitry 1487. As a further example, power source 1486 may comprise a source of power in the form of a battery or battery pack which is connected to, or integrated in, power circuitry 1487. The battery may provide backup power should the external power source fail. Other types of power sources, such as photovoltaic devices, may also be used.

Alternative embodiments of network node 1460 may include additional components beyond those shown in FIG. 14 that may be responsible for providing certain aspects of the network node's functionality, including any of the functionality described herein and/or any functionality necessary to support the subject matter described herein. For example, network node 1460 may include user interface equipment to allow input of information into network node 1460 and to allow output of information from network node 1460. This may allow a user to perform diagnostic, maintenance, repair, and other administrative functions for network node 1460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1410 includes antenna 1411, interface 1414, processing circuitry 1420, device readable medium 1430, user interface equipment 1432, auxiliary equipment 1434, power source 1436 and power circuitry 1437. WD 1410 may include multiple sets of one or more of the illustrated components for different wireless technologies supported by WD 1410, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1410.

Antenna 1411 may include one or more antennas or antenna arrays, configured to send and/or receive wireless signals, and is connected to interface 1414. In certain alternative embodiments, antenna 1411 may be separate from WD 1410 and be connectable to WD 1410 through an interface or port. Antenna 1411, interface 1414, and/or processing circuitry 1420 may be configured to perform any receiving or transmitting operations described herein as being performed by a WD. Any information, data and/or signals may be received from a network node and/or another WD. In some embodiments, radio front end circuitry and/or antenna 1411 may be considered an interface.

As illustrated, interface 1414 comprises radio front end circuitry 1412 and antenna 1411. Radio front end circuitry 1412 comprise one or more filters 1418 and amplifiers 1416. Radio front end circuitry 1414 is connected to antenna 1411 and processing circuitry 1420, and is configured to condition signals communicated between antenna 1411 and processing circuitry 1420. Radio front end circuitry 1412 may be coupled to or a part of antenna 1411. In some embodiments, WD 1410 may not include separate radio front end circuitry 1412; rather, processing circuitry 1420 may comprise radio front end circuitry and may be connected to antenna 1411. Similarly, in some embodiments, some or all of RF transceiver circuitry 1422 may be considered a part of interface 1414. Radio front end circuitry 1412 may receive digital data that is to be sent out to other network nodes or WDs via a wireless connection. Radio front end circuitry 1412 may convert the digital data into a radio signal having the appropriate channel and bandwidth parameters using a combination of filters 1418 and/or amplifiers 1416. The radio signal may then be transmitted via antenna 1411. Similarly, when receiving data, antenna 1411 may collect radio signals which are then converted into digital data by radio front end circuitry 1412. The digital data may be passed to processing circuitry 1420. In other embodiments, the interface may comprise different components and/or different combinations of components.

Processing circuitry 1420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1410 components, such as device readable medium 1430, WD 1410 functionality. Such functionality may include providing any of the various wireless features or benefits discussed herein. For example, processing circuitry 1420 may execute instructions stored in device readable medium 1430 or in memory within processing circuitry 1420 to provide the functionality disclosed herein.

As illustrated, processing circuitry 1420 includes one or more of RF transceiver circuitry 1422, baseband processing circuitry 1424, and application processing circuitry 1426. In other embodiments, the processing circuitry may comprise different components and/or different combinations of components. In certain embodiments processing circuitry 1420 of WD 1410 may comprise a SOC. In some embodiments, RF transceiver circuitry 1422, baseband processing circuitry 1424, and application processing circuitry 1426 may be on separate chips or sets of chips. In alternative embodiments, part or all of baseband processing circuitry 1424 and application processing circuitry 1426 may be combined into one chip or set of chips, and RF transceiver circuitry 1422 may be on a separate chip or set of chips. In still alternative embodiments, part or all of RF transceiver circuitry 1422 and baseband processing circuitry 1424 may be on the same chip or set of chips, and application processing circuitry 1426 may be on a separate chip or set of chips. In yet other alternative embodiments, part or all of RF transceiver circuitry 1422, baseband processing circuitry 1424, and application processing circuitry 1426 may be combined in the same chip or set of chips. In some embodiments, RF transceiver circuitry 1422 may be a part of interface 1414. RF transceiver circuitry 1422 may condition RF signals for processing circuitry 1420.

In certain embodiments, some or all of the functionality described herein as being performed by a WD may be provided by processing circuitry 1420 executing instructions stored on device readable medium 1430, which in certain embodiments may be a computer-readable storage medium. In alternative embodiments, some or all of the functionality may be provided by processing circuitry 1420 without executing instructions stored on a separate or discrete device readable storage medium, such as in a hard-wired manner. In any of those particular embodiments, whether executing instructions stored on a device readable storage medium or not, processing circuitry 1420 can be configured to perform the described functionality. The benefits provided by such functionality are not limited to processing circuitry 1420 alone or to other components of WD 1410, but are enjoyed by WD 1410 as a whole, and/or by end users and the wireless network generally.

Processing circuitry 1420 may be configured to perform any determining, calculating, or similar operations (e.g., certain obtaining operations) described herein as being performed by a WD. These operations, as performed by processing circuitry 1420, may include processing information obtained by processing circuitry 1420 by, for example, converting the obtained information into other information, comparing the obtained information or converted information to information stored by WD 1410, and/or performing one or more operations based on the obtained information or converted information, and as a result of said processing making a determination.

Device readable medium 1430 may be operable to store a computer program, software, an application including one or more of logic, rules, code, tables, etc. and/or other instructions capable of being executed by processing circuitry 1420. Device readable medium 1430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1420. In some embodiments, processing circuitry 1420 and device readable medium 1430 may be considered to be integrated.

User interface equipment 1432 may provide components that allow for a human user to interact with WD 1410. Such interaction may be of many forms, such as visual, audial, tactile, etc. User interface equipment 1432 may be operable to produce output to the user and to allow the user to provide input to WD 1410. The type of interaction may vary depending on the type of user interface equipment 1432 installed in WD 1410. For example, if WD 1410 is a smart phone, the interaction may be via a touch screen; if WD 1410 is a smart meter, the interaction may be through a screen that provides usage (e.g., the number of gallons used) or a speaker that provides an audible alert (e.g., if smoke is detected). User interface equipment 1432 may include input interfaces, devices and circuits, and output interfaces, devices and circuits. User interface equipment 1432 is configured to allow input of information into WD 1410, and is connected to processing circuitry 1420 to allow processing circuitry 1420 to process the input information. User interface equipment 1432 may include, for example, a microphone, a proximity or other sensor, keys/buttons, a touch display, one or more cameras, a USB port, or other input circuitry. User interface equipment 1432 is also configured to allow output of information from WD 1410, and to allow processing circuitry 1420 to output information from WD 1410. User interface equipment 1432 may include, for example, a speaker, a display, vibrating circuitry, a USB port, a headphone interface, or other output circuitry. Using one or more input and output interfaces, devices, and circuits, of user interface equipment 1432, WD 1410 may communicate with end users and/or the wireless network, and allow them to benefit from the functionality described herein.

Auxiliary equipment 1434 is operable to provide more specific functionality which may not be generally performed by WDs. This may comprise specialized sensors for doing measurements for various purposes, interfaces for additional types of communication such as wired communications etc. The inclusion and type of components of auxiliary equipment 1434 may vary depending on the embodiment and/or scenario.

Power source 1436 may, in some embodiments, be in the form of a battery or battery pack. Other types of power sources, such as an external power source (e.g., an electricity outlet), photovoltaic devices or power cells, may also be used. WD 1410 may further comprise power circuitry 1437 for delivering power from power source 1436 to the various parts of WD 1410 which need power from power source 1436 to carry out any functionality described or indicated herein. Power circuitry 1437 may in certain embodiments comprise power management circuitry. Power circuitry 1437 may additionally or alternatively be operable to receive power from an external power source; in which case WD 1410 may be connectable to the external power source (such as an electricity outlet) via input circuitry or an interface such as an electrical power cable. Power circuitry 1437 may also in certain embodiments be operable to deliver power from an external power source to power source 1436. This may be, for example, for the charging of power source 1436. Power circuitry 1437 may perform any formatting, converting, or other modification to the power from power source 1436 to make the power suitable for the respective components of WD 1410 to which power is supplied.

Figure 15:
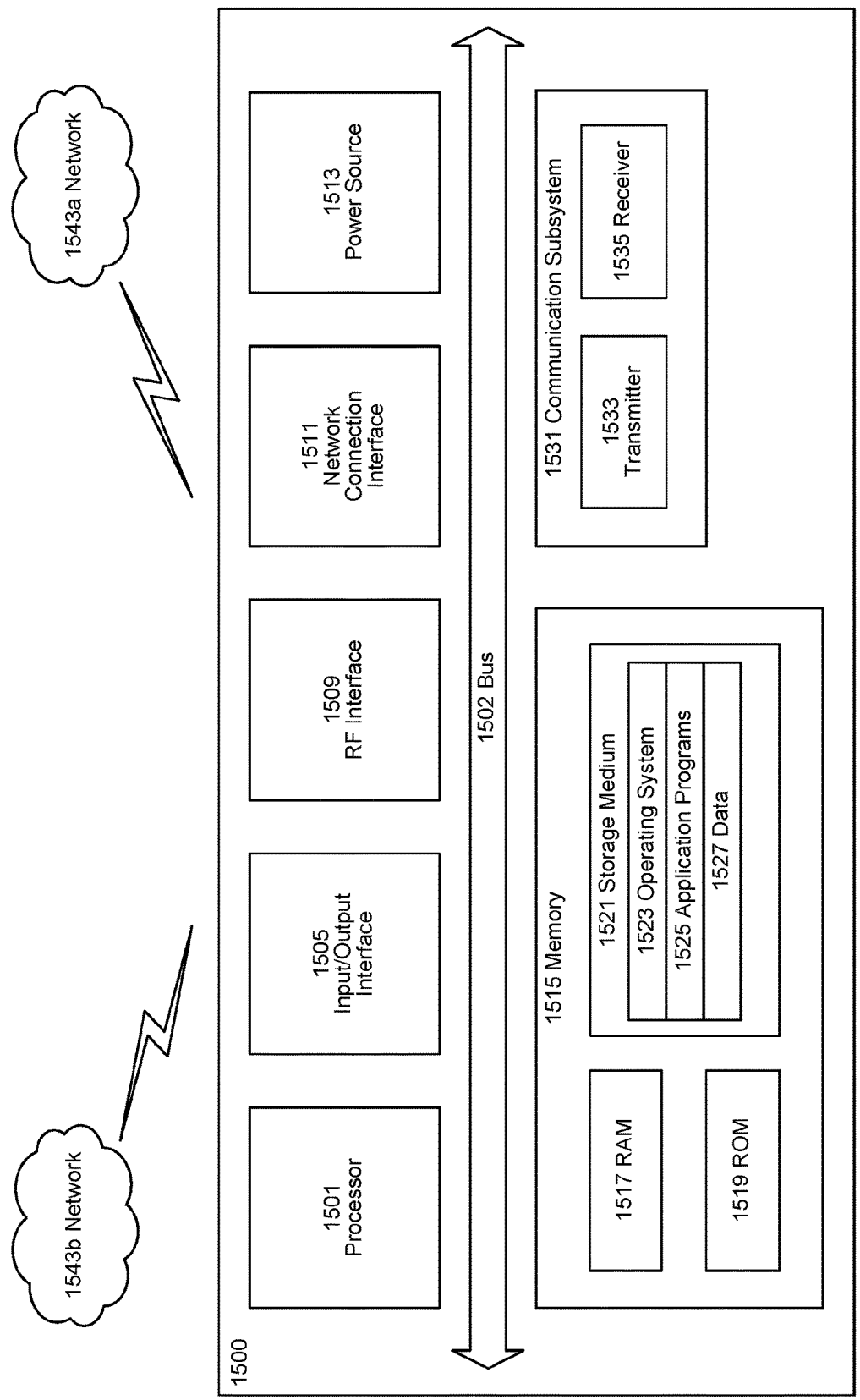
FIG. 15 is a block diagram of a user equipment according to some embodiments.

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1500 may be any UE identified by the $3^{rd}$ Generation Partnership Project (3GPP), including a NB-IoT UE, a machine type communication (MTC) UE, and/or an enhanced MTC (eMTC) UE. UE 1500, as illustrated in FIG. 15, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE 1500 includes processing circuitry 1501 that is operatively coupled to input/output interface 1505, radio frequency (RF) interface 1509, network connection interface 1511, memory 1515 including random access memory (RAM) 1517, read-only memory (ROM) 1519, and storage medium 1521 or the like, communication subsystem 1531, power source 1533, and/or any other component, or any combination thereof. Storage medium 1521 includes operating system 1523, application program 1525, and data 1527. In other embodiments, storage medium 1521 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry 1501 may be configured to process computer instructions and data. Processing circuitry 1501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1501 may include two central processing units (CPUs). Data may be information in a form suitable for use by a computer.

In the depicted embodiment, input/output interface 1505 may be configured to provide a communication interface to an input device, output device, or input and output device. UE 1500 may be configured to use an output device via input/output interface 1505. An output device may use the same type of interface port as an input device. For example, a USB port may be used to provide input to and output from UE 1500. The output device may be a speaker, a sound card, a video card, a display, a monitor, a printer, an actuator, an emitter, a smartcard, another output device, or any combination thereof. UE 1500 may be configured to use an input device via input/output interface 1505 to allow a user to capture information into UE 1500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface 1509 may be configured to provide a communication interface to RF components such as a transmitter, a receiver, and an antenna. Network connection interface 1511 may be configured to provide a communication interface to network 1543a. Network 1543a may encompass wired and/or wireless networks such as a local-area network (LAN), a wide-area network (WAN), a computer network, a wireless network, a telecommunications network, another like network or any combination thereof. For example, network 1543a may comprise a Wi-Fi network. Network connection interface 1511 may be configured to include a receiver and a transmitter interface used to communicate with one or more other devices over a communication network according to one or more communication protocols, such as Ethernet, TCP/IP, SONET, ATM, or the like. Network connection interface 1511 may implement receiver and transmitter functionality appropriate to the communication network links (e.g., optical, electrical, and the like). The transmitter and receiver functions may share circuit components, software or firmware, or alternatively may be implemented separately.

RAM 1517 may be configured to interface via bus 1502 to processing circuitry 1501 to provide storage or caching of data or computer instructions during the execution of software programs such as the operating system, application programs, and device drivers. ROM 1519 may be configured to provide computer instructions or data to processing circuitry 1501. For example, ROM 1519 may be configured to store invariant low-level system code or data for basic system functions such as basic input and output (I/O), startup, or reception of keystrokes from a keyboard that are stored in a non-volatile memory. Storage medium 1521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1521 may be configured to include operating system 1523, application program 1525 such as a web browser application, a widget or gadget engine or another application, and data file 1527. Storage medium 1521 may store, for use by UE 1500, any of a variety of various operating systems or combinations of operating systems.

Storage medium 1521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1521 may allow UE 1500 to access computer-executable instructions, application programs or the like, stored on transitory or non-transitory memory media, to off-load data, or to upload data. An article of manufacture, such as one utilizing a communication system may be tangibly embodied in storage medium 1521, which may comprise a device readable medium.

In FIG. 15, processing circuitry 1501 may be configured to communicate with network 1543*b* using communication subsystem 1531. Network 1543*a* and network 1543*b* may be the same network or networks or different network or networks. Communication subsystem 1531 may be configured to include one or more transceivers used to communicate with network 1543*b*. For example, communication subsystem 1531 may be configured to include one or more transceivers used to communicate with one or more remote transceivers of another device capable of wireless communication such as another WD, UE, or base station of a radio access network (RAN) according to one or more communication protocols, such as IEEE 802.16, CDMA, WCDMA, GSM, LTE, UTRAN, WiMax, or the like. Each transceiver may include transmitter 1533 and/or receiver 1535 to implement transmitter or receiver functionality, respectively, appropriate to the RAN links (e.g., frequency allocations and the like). Further, transmitter 1533 and receiver 1535 of each transceiver may share circuit components, software or firmware, or alternatively may be implemented separately.

In the illustrated embodiment, the communication functions of communication subsystem 1531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1531 may include cellular communication, Wi-Fi communication, Bluetooth communication, and GPS communication. Network 1543*b* may encompass wired and/or wireless networks such as a local-area network (LAN), a wide-area network (WAN), a computer network, a wireless network, a telecommunications network, another like network or any combination thereof. For example, network 1543*b* may be a cellular network, a Wi-Fi network, and/or a near-field network. Power source 1513 may be configured to provide alternating current (AC) or direct current (DC) power to components of UE 1500.

The features, benefits and/or functions described herein may be implemented in one of the components of UE 1500 or partitioned across multiple components of UE 1500. Further, the features, benefits, and/or functions described herein may be implemented in any combination of hardware, software or firmware. In one example, communication subsystem 1531 may be configured to include any of the components described herein. Further, processing circuitry 1501 may be configured to communicate with any of such components over bus 1502. In another example, any of such components may be represented by program instructions stored in memory that when executed by processing circuitry 1501 perform the corresponding functions described herein. In another example, the functionality of any of such components may be partitioned between processing circuitry 1501 and communication subsystem 1531. In another example, the non-computationally intensive functions of any of such components may be implemented in software or firmware and the computationally intensive functions may be implemented in hardware.

Figure 16:
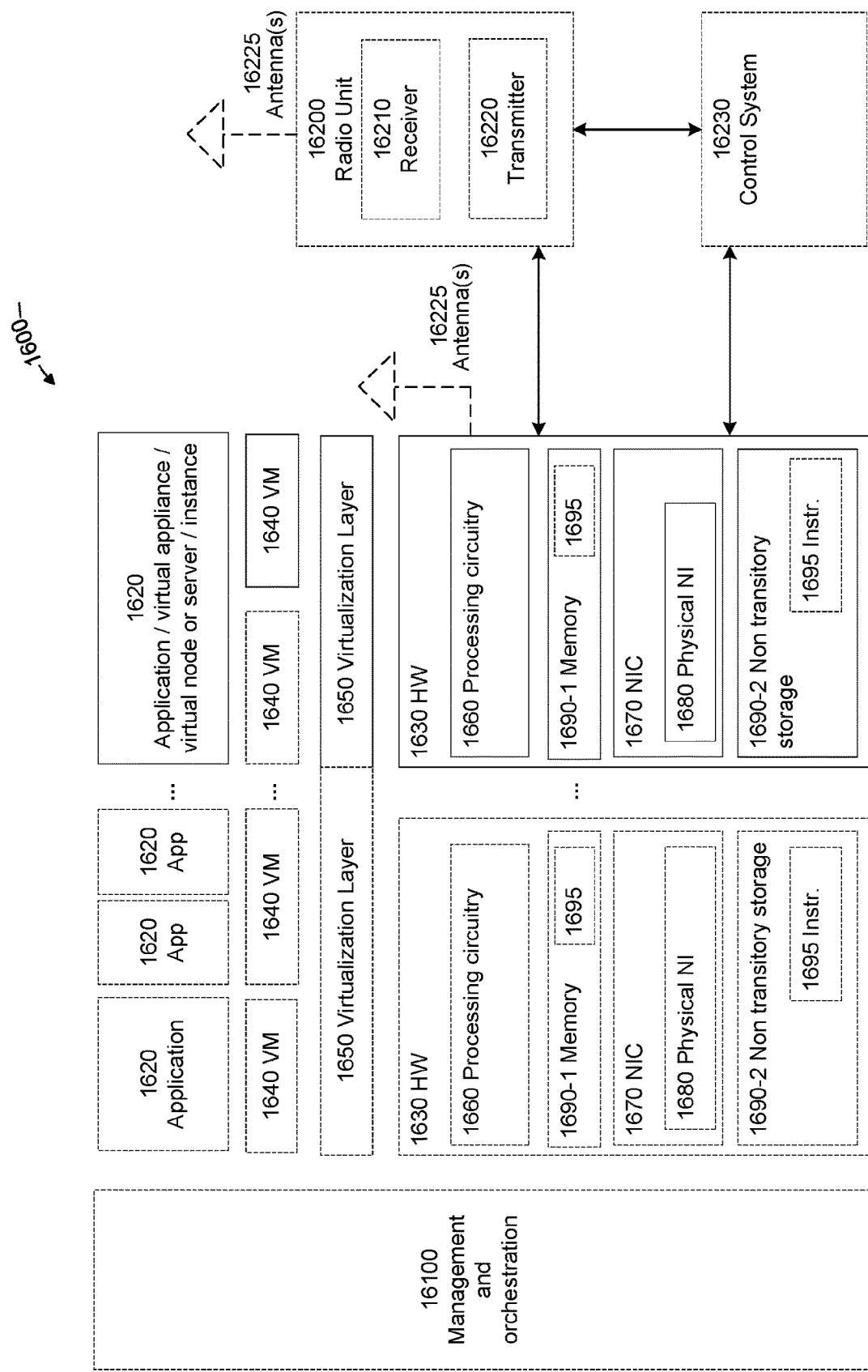
FIG. 16 is a block diagram of a virtualization environment according to some embodiments.

FIG. 16 is a schematic block diagram illustrating a virtualization environment 1600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1600 hosted by one or more of hardware nodes 1630. Further, in embodiments in which the virtual node is not a radio access node or does not require radio connectivity (e.g., a core network node), then the network node may be entirely virtualized.

The functions may be implemented by one or more applications 1620 (which may alternatively be called software instances, virtual appliances, network functions, virtual nodes, virtual network functions, etc.) operative to implement some of the features, functions, and/or benefits of some of the embodiments disclosed herein. Applications 1620 are run in virtualization environment 1600 which provides hardware 1630 comprising processing circuitry 1660 and memory 1690. Memory 1690 contains instructions 1695 executable by processing circuitry 1660 whereby application 1620 is operative to provide one or more of the features, benefits, and/or functions disclosed herein.

Virtualization environment 1600, comprises general-purpose or special-purpose network hardware devices 1630 comprising a set of one or more processors or processing circuitry 1660, which may be commercial off-the-shelf (COTS) processors, dedicated Application Specific Integrated Circuits (ASICs), or any other type of processing circuitry including digital or analog hardware components or special purpose processors. Each hardware device may comprise memory 1690-1 which may be non-persistent memory for temporarily storing instructions 1695 or software executed by processing circuitry 1660. Each hardware device may comprise one or more network interface controllers (NICs) 1670, also known as network interface cards, which include physical network interface 1680. Each hardware device may also include non-transitory, persistent, machine-readable storage media 1690-2 having stored therein software 1695 and/or instructions executable by processing circuitry 1660. Software 1695 may include any type of software including software for instantiating one or more virtualization layers 1650 (also referred to as hypervisors), software to execute virtual machines 1640 as well as software allowing it to execute functions, features and/or benefits described in relation with some embodiments described herein.

Virtual machines 1640, comprise virtual processing, virtual memory, virtual networking or interface and virtual storage, and may be run by a corresponding virtualization layer 1650 or hypervisor. Different embodiments of the instance of virtual appliance 1620 may be implemented on one or more of virtual machines 1640, and the implementations may be made in different ways.

During operation, processing circuitry 1660 executes software 1695 to instantiate the hypervisor or virtualization layer 1650, which may sometimes be referred to as a virtual machine monitor (VMM). Virtualization layer 1650 may present a virtual operating platform that appears like networking hardware to virtual machine 1640.

As shown in FIG. 16, hardware 1630 may be a standalone network node with generic or specific components. Hardware 1630 may comprise antenna 16225 and may implement some functions via virtualization. Alternatively, hardware 1630 may be part of a larger cluster of hardware (e.g. such as in a data center or customer premise equipment (CPE)) where many hardware nodes work together and are managed via management and orchestration (MANO) 16100, which, among others, oversees lifecycle management of applications 1620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1640 may be a software implementation of a physical machine that runs programs as if they were executing on a physical, non-virtualized machine. Each of virtual machines 1640, and that part of hardware 1630 that executes that virtual machine, be it hardware dedicated to that virtual machine and/or hardware shared by that virtual machine with others of the virtual machines 1640, forms a separate virtual network elements (VNE).

Still in the context of NFV, Virtual Network Function (VNF) is responsible for handling specific network functions that run in one or more virtual machines 1640 on top of hardware networking infrastructure 1630 and corresponds to application 1620 in FIG. 16.

In some embodiments, one or more radio units 16200 that each include one or more transmitters 16220 and one or more receivers 16210 may be coupled to one or more antennas 16225. Radio units 16200 may communicate directly with hardware nodes 1630 via one or more appropriate network interfaces and may be used in combination with the virtual components to provide a virtual node with radio capabilities, such as a radio access node or a base station.

In some embodiments, some signalling can be effected with the use of control system 16230 which may alternatively be used for communication between the hardware nodes 1630 and radio units 16200.

Figure 17:
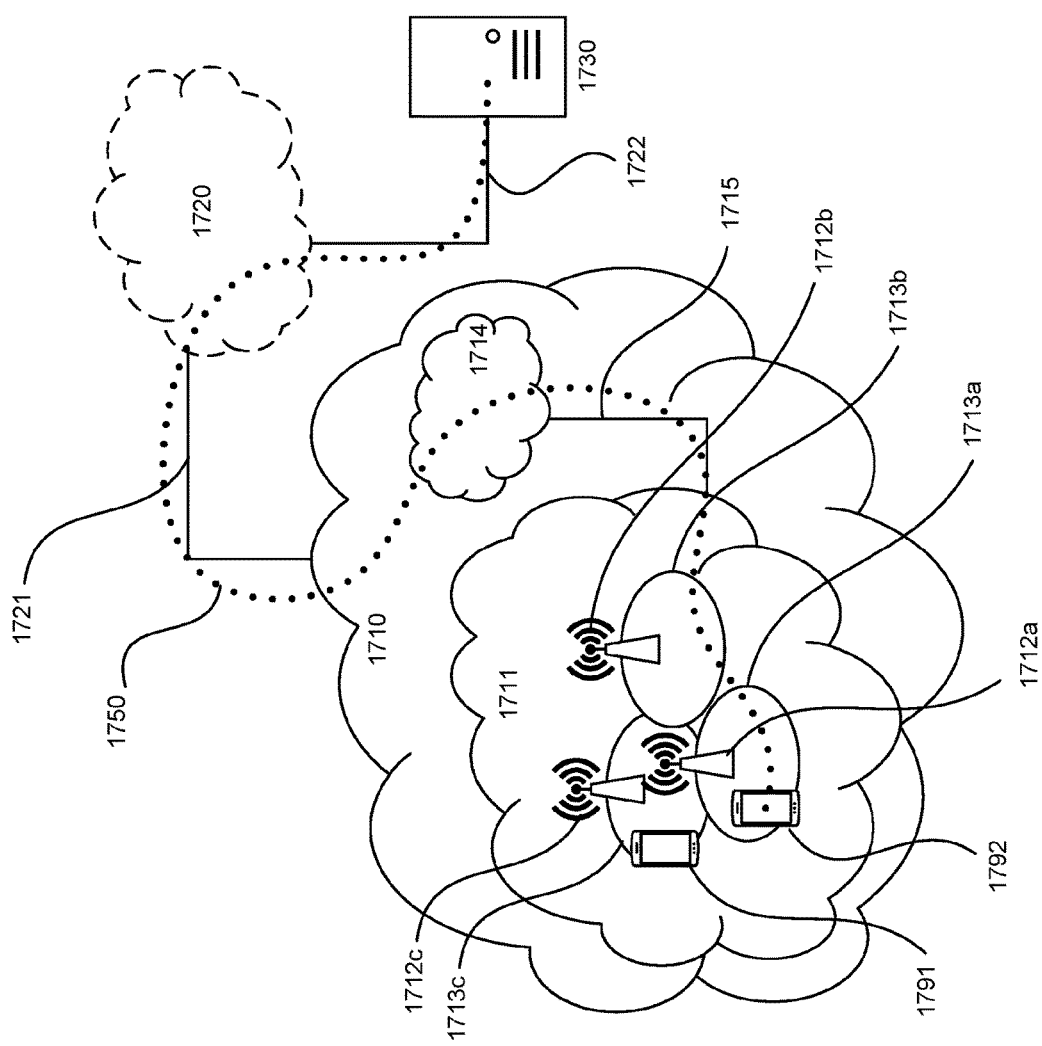
FIG. 17 is a block diagram of a communication network with a host computer according to some embodiments.

FIG. 17 illustrates a telecommunication network connected via an intermediate network to a host computer in accordance with some embodiments. In particular, with reference to FIG. 17, in accordance with an embodiment, a communication system includes telecommunication network 1710, such as a 3GPP-type cellular network, which comprises access network 1711, such as a radio access network, and core network 1714. Access network 1711 comprises a plurality of base stations 1712*a*, 1712*b*, 1712*c*, such as NBs, eNBs, gNBs or other types of wireless access points, each defining a corresponding coverage area 1713*a*, 1713*b*, 1713*c*. Each base station 1712*a*, 1712*b*, 1712*c* is connectable to core network 1714 over a wired or wireless connection 1715. A first UE 1791 located in coverage area 1713*c* is configured to wirelessly connect to, or be paged by, the corresponding base station 1712*c*. A second UE 1792 in coverage area 1713*a* is wirelessly connectable to the corresponding base station 1712*a*. While a plurality of UEs 1791, 1792 are illustrated in this example, the disclosed embodiments are equally applicable to a situation where a sole UE is in the coverage area or where a sole UE is connecting to the corresponding base station 1712.

Telecommunication network 1710 is itself connected to host computer 1730, which may be embodied in the hardware and/or software of a standalone server, a cloud-implemented server, a distributed server or as processing resources in a server farm. Host computer 1730 may be under the ownership or control of a service provider, or may be operated by the service provider or on behalf of the service provider. Connections 1721 and 1722 between telecommunication network 1710 and host computer 1730 may extend directly from core network 1714 to host computer 1730 or may go via an optional intermediate network 1720. Intermediate network 1720 may be one of, or a combination of more than one of, a public, private or hosted network; intermediate network 1720, if any, may be a backbone network or the Internet; in particular, intermediate network 1720 may comprise two or more sub-networks (not shown).

The communication system of FIG. 17 as a whole enables connectivity between the connected UEs 1791, 1792 and host computer 1730. The connectivity may be described as an over-the-top (OTT) connection 1750. Host computer 1730 and the connected UEs 1791, 1792 are configured to communicate data and/or signaling via OTT connection 1750, using access network 1711, core network 1714, any intermediate network 1720 and possible further infrastructure (not shown) as intermediaries. OTT connection 1750 may be transparent in the sense that the participating communication devices through which OTT connection 1750 passes are unaware of routing of uplink and downlink communications. For example, base station 1712 may not or need not be informed about the past routing of an incoming downlink communication with data originating from host computer 1730 to be forwarded (e.g., handed over) to a connected UE 1791. Similarly, base station 1712 need not be aware of the future routing of an outgoing uplink communication originating from the UE 1791 towards the host computer 1730.

Figure 18:
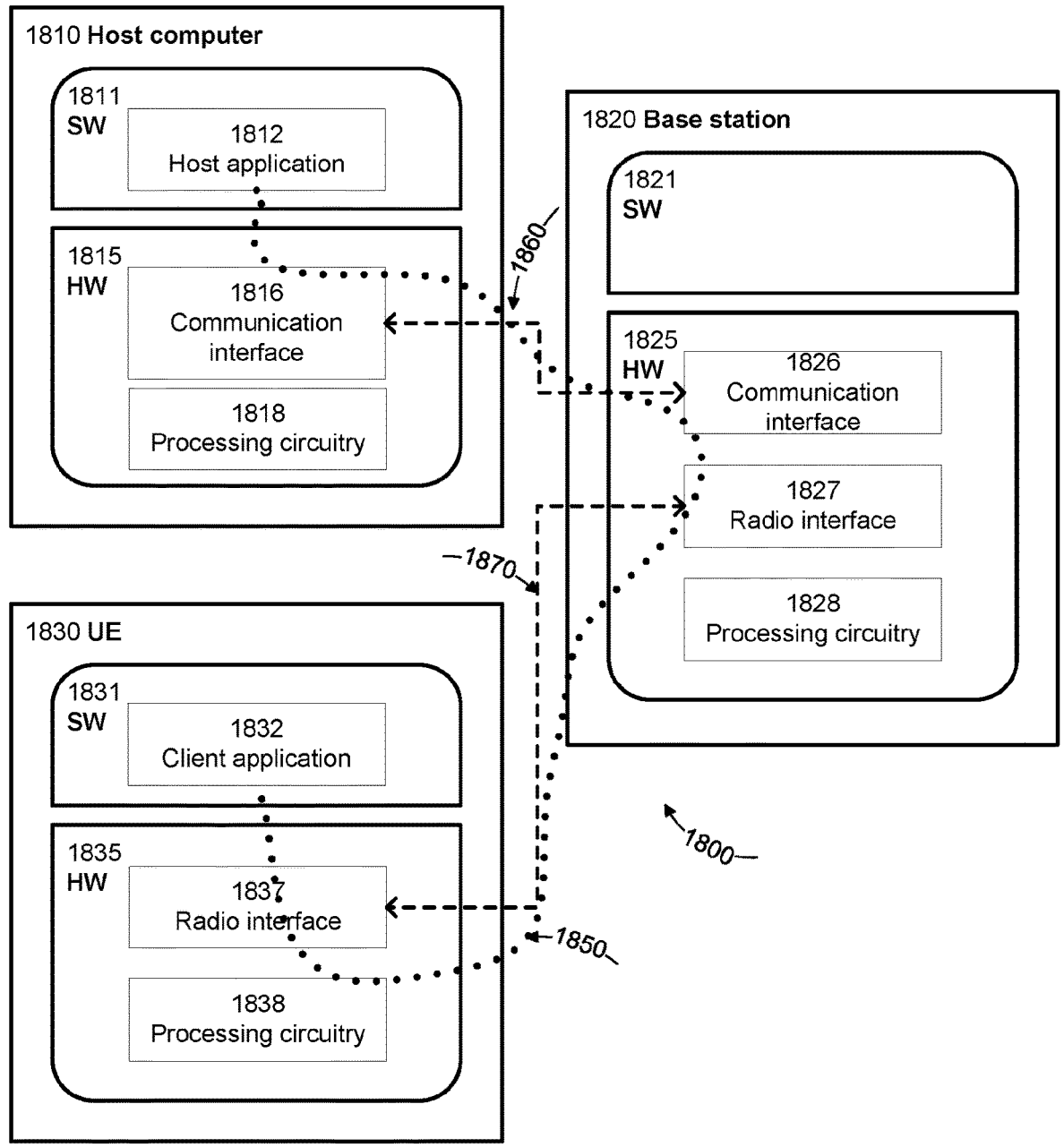
FIG. 18 is a block diagram of a host computer according to some embodiments.

Example implementations, in accordance with an embodiment, of the UE, base station and host computer discussed in the preceding paragraphs will now be described with reference to FIG. 18. FIG. 18 illustrates host computer communicating via a base station with a user equipment over a partially wireless connection in accordance with some embodiments In communication system 1800, host computer 1810 comprises hardware 1815 including communication interface 1816 configured to set up and maintain a wired or wireless connection with an interface of a different communication device of communication system 1800. Host computer 1810 further comprises processing circuitry 1818, which may have storage and/or processing capabilities. In particular, processing circuitry 1818 may comprise one or more programmable processors, application-specific integrated circuits, field programmable gate arrays or combinations of these (not shown) adapted to execute instructions.

Host computer 1810 further comprises software 1811, which is stored in or accessible by host computer 1810 and executable by processing circuitry 1818. Software 1811 includes host application 1812. Host application 1812 may be operable to provide a service to a remote user, such as UE 1830 connecting via OTT connection 1850 terminating at UE 1830 and host computer 1810. In providing the service to the remote user, host application 1812 may provide user data which is transmitted using OTT connection 1850.

Communication system 1800 further includes base station 1820 provided in a telecommunication system and comprising hardware 1825 enabling it to communicate with host computer 1810 and with UE 1830. Hardware 1825 may include communication interface 1826 for setting up and maintaining a wired or wireless connection with an interface of a different communication device of communication system 1800, as well as radio interface 1827 for setting up and maintaining at least wireless connection 1870 with UE 1830 located in a coverage area (not shown in FIG. 18) served by base station 1820. Communication interface 1826 may be configured to facilitate connection 1860 to host computer 1810. Connection 1860 may be direct or it may pass through a core network (not shown in FIG. 18) of the telecommunication system and/or through one or more intermediate networks outside the telecommunication system. In the embodiment shown, hardware 1825 of base station 1820 further includes processing circuitry 1828, which may comprise one or more programmable processors, application-specific integrated circuits, field programmable gate arrays or combinations of these (not shown) adapted to execute instructions. Base station 1820 further has software 1821 stored internally or accessible via an external connection.

Communication system 1800 further includes UE 1830 already referred to. Its hardware 1835 may include radio interface 1837 configured to set up and maintain wireless connection 1870 with a base station serving a coverage area in which UE 1830 is currently located. Hardware 1835 of UE 1830 further includes processing circuitry 1838, which may comprise one or more programmable processors, application-specific integrated circuits, field programmable gate arrays or combinations of these (not shown) adapted to execute instructions. UE 1830 further comprises software 1831, which is stored in or accessible by UE 1830 and executable by processing circuitry 1838. Software 1831 includes client application 1832. Client application 1832 may be operable to provide a service to a human or non-human user via UE 1830, with the support of host computer 1810. In host computer 1810, an executing host application 1812 may communicate with the executing client application 1832 via OTT connection 1850 terminating at UE 1830 and host computer 1810. In providing the service to the user, client application 1832 may receive request data from host application 1812 and provide user data in response to the request data. OTT connection 1850 may transfer both the request data and the user data. Client application 1832 may interact with the user to generate the user data that it provides.

It is noted that host computer 1810, base station 1820 and UE 1830 illustrated in FIG. 18 may be similar or identical to host computer 1730, one of base stations 1712*a*, 1712*b*, 1712*c* and one of UEs 1791, 1792 of FIG. 17, respectively. This is to say, the inner workings of these entities may be as shown in FIG. 18 and independently, the surrounding network topology may be that of FIG. 17.

In FIG. 18, OTT connection 1850 has been drawn abstractly to illustrate the communication between host computer 1810 and UE 1830 via base station 1820, without explicit reference to any intermediary devices and the precise routing of messages via these devices. Network infrastructure may determine the routing, which it may be configured to hide from UE 1830 or from the service provider operating host computer 1810, or both. While OTT connection 1850 is active, the network infrastructure may further take decisions by which it dynamically changes the routing (e.g., on the basis of load balancing consideration or reconfiguration of the network).

Wireless connection 1870 between UE 1830 and base station 1820 is in accordance with the teachings of the embodiments described throughout this disclosure. One or more of the various embodiments improve the performance of OTT services provided to UE 1830 using OTT connection 1850, in which wireless connection 1870 forms the last segment. More precisely, the teachings of these embodiments may resolve random access response ambiguity without increasing the value space of random access channel occasion identifiers (e.g., RA-RNTIs) and thereby provide benefits such as reduced computational burden at the wireless device and network, extended battery lifetime at the wireless device, decreased miss-detection probability for random access, and better responsiveness.

A measurement procedure may be provided for the purpose of monitoring data rate, latency and other factors on which the one or more embodiments improve. There may further be an optional network functionality for reconfiguring OTT connection 1850 between host computer 1810 and UE 1830, in response to variations in the measurement results. The measurement procedure and/or the network functionality for reconfiguring OTT connection 1850 may be implemented in software 1811 and hardware 1815 of host computer 1810 or in software 1831 and hardware 1835 of UE 1830, or both. In embodiments, sensors (not shown) may be deployed in or in association with communication devices through which OTT connection 1850 passes; the sensors may participate in the measurement procedure by supplying values of the monitored quantities exemplified above, or supplying values of other physical quantities from which software 1811, 1831 may compute or estimate the monitored quantities. The reconfiguring of OTT connection 1850 may include message format, retransmission settings, preferred routing etc.; the reconfiguring need not affect base station 1820, and it may be unknown or imperceptible to base station 1820. Such procedures and functionalities may be known and practiced in the art. In certain embodiments, measurements may involve proprietary UE signaling facilitating host computer 1810's measurements of throughput, propagation times, latency and the like. The measurements may be implemented in that software 1811 and 1831 causes messages to be transmitted, in particular empty or 'dummy' messages, using OTT connection 1850 while it monitors propagation times, errors etc.

Figure 19:
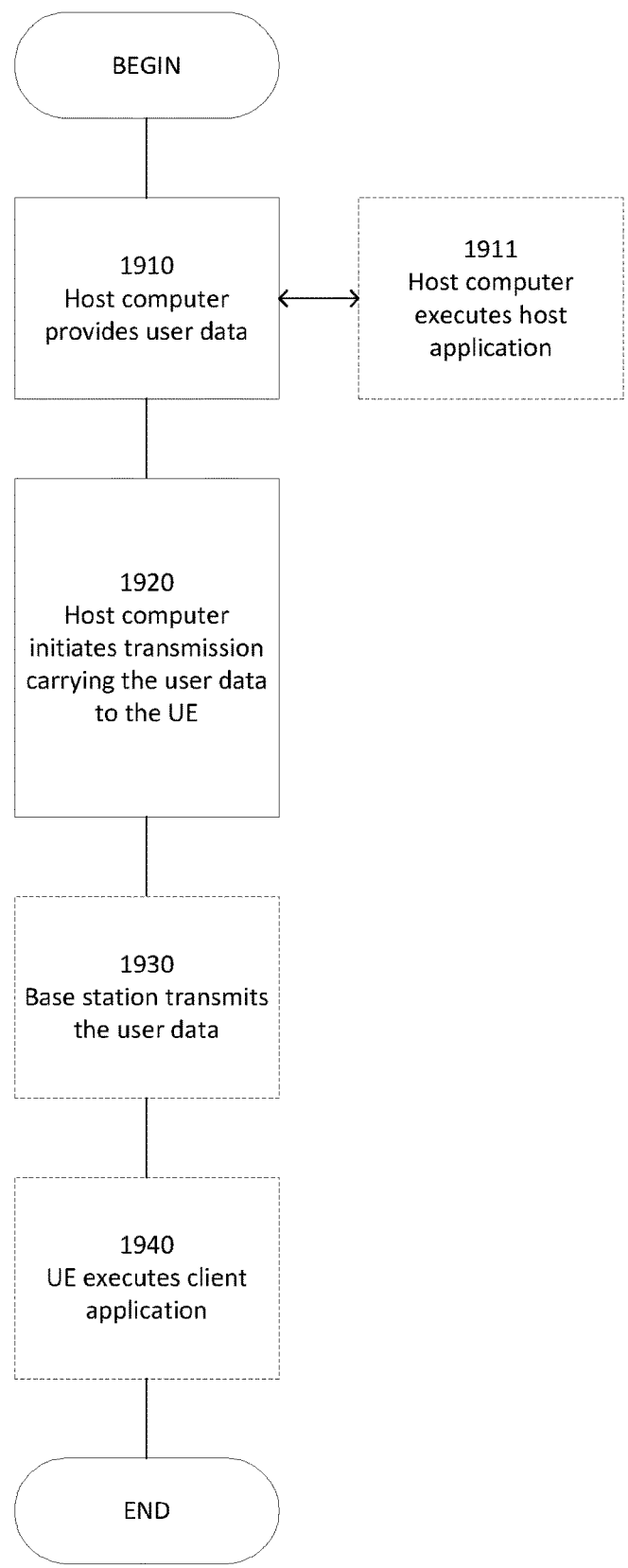
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section. In step 1910, the host computer provides user data. In substep 1911 (which may be optional) of step 1910, the host computer provides the user data by executing a host application. In step 1919, the host computer initiates a transmission carrying the user data to the UE. In step 1930 (which may be optional), the base station transmits to the UE the user data which was carried in the transmission that the host computer initiated, in accordance with the teachings of the embodiments described throughout this disclosure. In step 1940 (which may also be optional), the UE executes a client application associated with the host application executed by the host computer.

Figure 20:
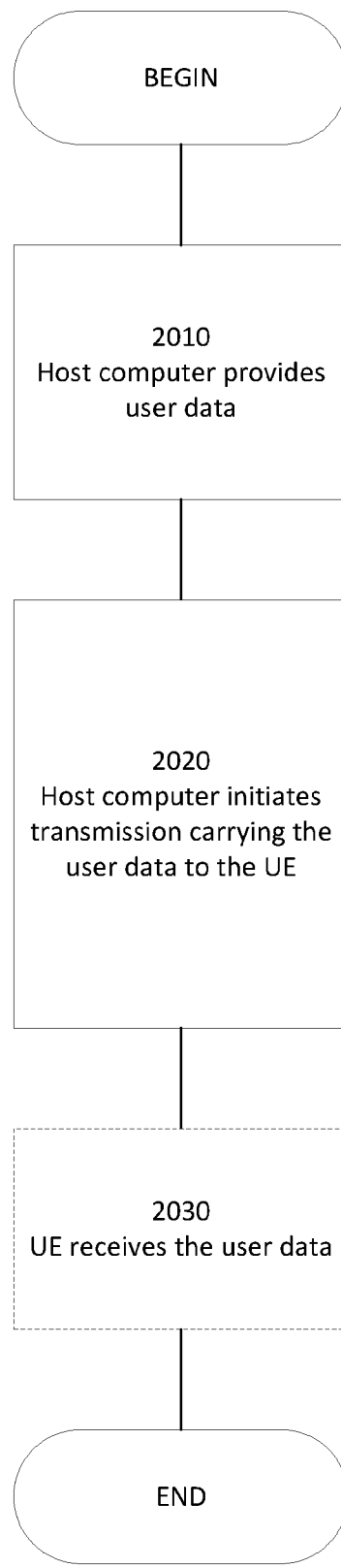
FIG. 20 is a flowchart illustrating a method implemented in a communication system, in accordance with one embodiment.

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In step 2110 of the method, the host computer provides user data. In an optional substep (not shown) the host computer provides the user data by executing a host application. In step 2020, the host computer initiates a transmission carrying the user data to the UE. The transmission may pass via the base station, in accordance with the teachings of the embodiments described throughout this disclosure. In step 2030 (which may be optional), the UE receives the user data carried in the transmission.

Figure 21:
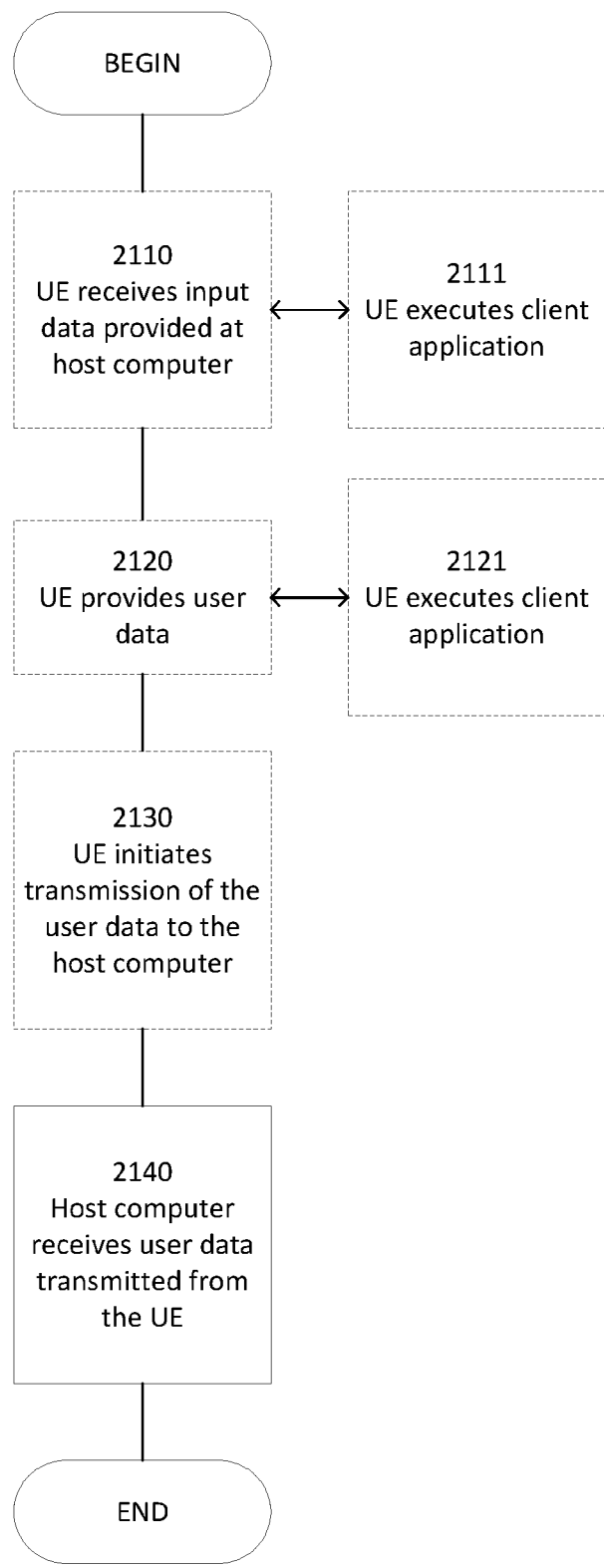
FIG. 21 is a flowchart illustrating a method implemented in a communication system, in accordance with one embodiment.

FIG. 21 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 21 will be included in this section. In step 2110 (which may be optional), the UE receives input data provided by the host computer. Additionally or alternatively, in step 2120, the UE provides user data. In substep 2121 (which may be optional) of step 2120, the UE provides the user data by executing a client application. In substep 2111 (which may be optional) of step 2110, the UE executes a client application which provides the user data in reaction to the received input data provided by the host computer. In providing the user data, the executed client application may further consider user input received from the user. Regardless of the specific manner in which the user data was provided, the UE initiates, in substep 2130 (which may be optional), transmission of the user data to the host computer. In step 2140 of the method, the host computer receives the user data transmitted from the UE, in accordance with the teachings of the embodiments described throughout this disclosure.

Figure 22:
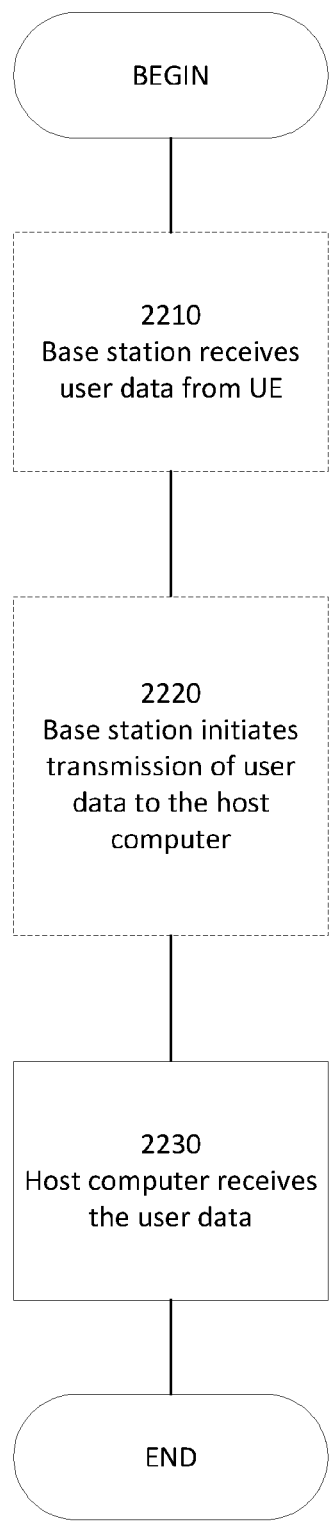
FIG. 22 is a flowchart illustrating a method implemented in a communication system, in accordance with one embodiment.

FIG. 22 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 22 will be included in this section. In step 2210 (which may be optional), in accordance with the teachings of the embodiments described throughout this disclosure, the base station receives user data from the UE. In step 2220 (which may be optional), the base station initiates transmission of the received user data to the host computer. In step 2230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:
1. A method performed by a wireless device, the method comprising:
transmitting a random access preamble;
receiving, from a network node, a random access response that is a response to receipt by the network node of a received random access preamble and that includes an information field indicating information about a system frame in which the network node received the received random access preamble, wherein the information field indicates:
a value of y=SFNy mod N, where SFNy is an index of the system frame in which the network node received the received random access preamble, and where N is a maximum duration of a random access response window in terms of a number of system frames; or
a number Dy of system frames between the system frame in which the network node received the received random access preamble and a system frame in which the network node transmitted the random access response; and
verifying, based on the information field and a system frame in which the wireless device transmitted the transmitted random access preamble, whether the random access response is addressed to the wireless device.

2. The method of claim 1, wherein the information field is a reserved (R) bit field.

3. The method of claim 1, wherein the information field indicates the value of y=SFNy mod N.

4. The method of claim 3, wherein N is 2 such that y=0 when the index of the system frame in which the network node received the received random access preamble is even and y=1 when the index of the system frame in which the network node received the received random access preamble is odd.

5. The method of claim 3, wherein said verifying comprises:
determining a value of x=SFNx mod N, where SFNx is an index of the system frame in which the wireless device transmitted the transmitted random access preamble; and
determining whether the random access response is addressed to the wireless device based on whether x=y.

6. The method of claim 1, wherein the information field indicates the number Dy of system frames between the system frame in which the network node received the received random access preamble and the system frame in which the network node transmitted the random access response.

7. The method of claim 6, wherein said verifying comprises:
determining a number Dx of system frames between the system frame in which the wireless device transmitted the transmitted random access preamble and the system frame in which the wireless device received the random access response; and
determining whether the random access response is addressed to the wireless device based on whether Dx equals Dy as indicated by the information field.

8. The method of claim 1, wherein a random access response window has a duration greater than a duration of a system frame.

9. The method of claim 1, wherein said verifying comprises:
determining, from the information field, the system frame in which the network node received the received random access preamble; and
verifying whether or not the random access response is addressed to the wireless device based, at least in part, on whether or not the system frame in which the network node received the received random access preamble according to said determining is the same as the system frame in which the wireless device transmitted the transmitted random access preamble.

10. The method of claim 1, wherein said verifying is further based on whether a cyclic redundancy check (CRC) of the random access response is scrambled with a random access radio network temporary identifier (RA-RNTI) associated with a random access channel occasion in which the wireless device transmitted the transmitted random access preamble.

11. The method of claim 1, further comprising processing or discarding the random access response, depending respectively on whether the random access response is or is not addressed to the wireless device according to said verifying.

12. The method of claim 1, further comprising, based on the random access response being addressed to the wireless device according to said verifying, transmitting a connection request to a radio network node from which the random access response was received.

13. The method of claim 1, wherein the random access preamble is transmitted, and/or the random access response is received, in unlicensed frequency spectrum.

14. The method of claim 1, wherein the information field has a value equal to y=SFNy mod N or the number Dy.

15. A method performed by a network node, the method comprising:
receiving a random access preamble; and
transmitting a random access response that is a response to receipt by the network node of the received random access preamble and that includes an information field indicating information about a system frame in which the network node received the received random access preamble, wherein the information field indicates:
a value of y=SFNy mod N, where SFNy is an index of the system frame in which the network node received the received random access preamble, and where N is a maximum duration of a random access response window in terms of a number of system frames; or
a number Dy of system frames between the system frame in which the network node received the received random access preamble and a system frame in which the network node transmitted the random access response.

16. The method of claim 15, wherein the information field is a reserved (R) bit field.

17. The method of claim 15, wherein the information field indicates the value of y=SFNy mod N.

18. The method of claim 17, wherein N is 2 such that y=0 when the index of the system frame in which the network node received the received random access preamble is even and y=1 when the index of the system frame in which the network node received the received random access preamble is odd.

19. The method of claim 15, wherein the information field indicates a number Dy of system frames between the system frame in which the network node received the received random access preamble and the system frame in which the network node transmitted the random access response.

20. The method of claim 15, wherein the random access preamble is received, and/or the random access response is transmitted, in unlicensed frequency spectrum, and wherein the method further comprises performing a listen-before-talk (LBT) procedure or a clear channel assessment (CCA) before transmitting the random access response.

21. The method of claim 15, wherein the information field has a value equal to y=SFNy mod N or the number Dy.

22. A wireless device comprising:
communication circuitry; and
processing circuitry configured to:
  transmit a random access preamble;
  receive, from a network node, a random access response that is a response to receipt by the network node of a received random access preamble and that includes an information field indicating information about a system frame in which the network node received the received random access preamble, wherein the information field indicates:
    a value of y=SFNy mod N, where SFNy is an index of the system frame in which the network node received the received random access preamble, and where N is a maximum duration of a random access response window in terms of a number of system frames; or
    a number Dy of system frames between the system frame in which the network node received the received random access preamble and a system frame in which the network node transmitted the random access response; and
  verify, based on the information field and a system frame in which the wireless device transmitted the transmitted random access preamble, whether the random access response is addressed to the wireless device.

23. The wireless device of claim 22, wherein the information field has a value equal to y=SFNy mod N or the number Dy.

24. A network node comprising:
communication circuitry; and
processing circuitry configured to:
  receive a random access preamble; and
  transmit a random access response that is a response to receipt by the network node of the received random access preamble and that includes an information field indicating information about a system frame in which the network node received the received random access preamble, wherein the information field indicates:
    a value of y=SFNy mod N, where SFNy is an index of the system frame in which the network node received the received random access preamble, and where N is a maximum duration of a random access response window in terms of a number of system frames; or
    a number Dy of system frames between the system frame in which the network node received the received random access preamble and a system frame in which the network node transmitted the random access response.

25. The network node of claim 24, wherein the information field has a value equal to y=SFNy mod N or the number Dy.

* * * * *